(12) United States Patent
Ito et al.

(10) Patent No.: US 9,151,238 B2
(45) Date of Patent: Oct. 6, 2015

(54) FAULT DIAGNOSIS METHOD, FAULT DIAGNOSIS SYSTEM, AND FAULT DIAGNOSIS DEVICE FOR ENGINE

(75) Inventors: Hiroshi Ito, Tokyo (JP); Masami Haishima, Saitama (JP); Koji Watanabe, Asaka (JP); Kensuke Yagi, Fujimi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 250 days.

(21) Appl. No.: 14/008,175

(22) PCT Filed: Feb. 24, 2012

(86) PCT No.: PCT/JP2012/054515
§ 371 (c)(1),
(2), (4) Date: Sep. 27, 2013

(87) PCT Pub. No.: WO2012/132677
PCT Pub. Date: Oct. 4, 2012

(65) Prior Publication Data
US 2014/0020655 A1 Jan. 23, 2014

(30) Foreign Application Priority Data
Mar. 29, 2011 (JP) .................................. 2011-071415

(51) Int. Cl.
*F02D 41/00* (2006.01)
*F02D 41/22* (2006.01)
(Continued)

(52) U.S. Cl.
CPC ................ *F02D 41/00* (2013.01); *F02D 41/22* (2013.01); *G01M 15/11* (2013.01); *F02D 17/02* (2013.01); *F02D 2200/1015* (2013.01); *Y02T 10/40* (2013.01)

(58) Field of Classification Search
CPC . F02D 2200/1015; F02D 41/00; F02D 41/22; F02D 45/00; F02B 77/08; F01M 15/11
USPC ............... 123/339.1, 339.11, 339.15, 406.13, 123/406.14, 406.16, 406.27, 406.29, 123/406.33; 701/101, 103, 111, 114; 73/114.08, 114.62
See application file for complete search history.

(56) References Cited

U.S. PATENT DOCUMENTS 5,636,620 A * 6/1997 Kiess et al. .................... 123/625
5,696,676 A * 12/1997 Takaba .......................... 701/33.4
(Continued)

FOREIGN PATENT DOCUMENTS

DE 195 40 826 A1 5/1997
EP 1 750 111 A1 2/2007
(Continued)

OTHER PUBLICATIONS

European Search Report application No. 12765688.2 dated Oct. 10, 2014.
(Continued)

*Primary Examiner* — John Kwon
*Assistant Examiner* — Johnny H Hoang
(74) *Attorney, Agent, or Firm* — Squire Patton Boggs (US) LLP

(57) ABSTRACT

In the present fault diagnosis method and the fault diagnosis system for an engine, an external diagnosis device: obtains continuous data on the incidences of misfire by misfiring cylinders from the vehicle's side with regard to the actually occurring misfire or past incidences of misfire; detects a misfire pattern, which is to be classified according to the presence of continuous incidences of misfire, on the basis of the continuous data; and narrows down a fault site in accordance with the misfire pattern.

11 Claims, 16 Drawing Sheets

(51) Int. Cl.
*G01M 15/11* (2006.01)
*F02D 17/02* (2006.01)

(56) References Cited

U.S. PATENT DOCUMENTS

| | | | |
|---|---|---|---|
| 5,878,366 A | 3/1999 | Schricker et al. | |
| 6,359,439 B1 * | 3/2002 | Crecelius et al. | 324/391 |
| 6,766,243 B1 * | 7/2004 | Haussmann et al. | 701/114 |
| 7,069,911 B1 * | 7/2006 | Kubani et al. | 123/481 |
| 7,899,608 B1 * | 3/2011 | Pederson et al. | 701/111 |
| 2007/0261484 A1 | 11/2007 | Nishigaki et al. | |

FOREIGN PATENT DOCUMENTS

| | | | |
|---|---|---|---|
| EP | 2 690 271 A1 | 1/2014 | |
| GB | 2 245 027 A | 12/1991 | |
| JP | 03-189371 A | 8/1991 | |
| JP | 4-36044 A | 2/1992 | |
| JP | 05-202801 A | 8/1993 | |
| JP | 2004-019465 A | 1/2004 | |
| JP | 2005-054630 A | 3/2005 | |
| JP | 2005-146905 A | 6/2005 | |
| JP | 2009-222018 A | 10/2009 | |
| JP | 2009-270543 A | 11/2009 | |
| JP | 2009-280082 A | 12/2009 | |
| JP | 2010-133419 A | 6/2010 | |

OTHER PUBLICATIONS

International Search Report mailed Mar. 27, 2012, issued in corresponding International Application No. PCT/JP2012/054515.

\* cited by examiner

| MISFIRE PATTERN | MISFIRE DETAILS (MISFIRE SYMPTOM) | | POSSIBLE FAULTY REGION |
|---|---|---|---|
| 1 | SINGLE CYLINDER – SUCCESSIVE MISFIRES<br>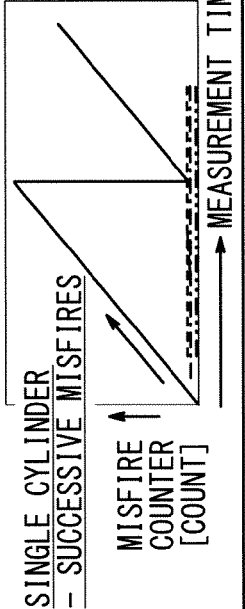MISFIRE COUNTER [COUNT] → MEASUREMENT TIME | ·MISFIRING CYLINDER MISFIRES EVERY TIME AND MISFIRE COUNTER COUNTS UP SUCCESSIVELY (LINEARLY)<br>·MISFIRE COUNTER COUNTS UP FOR ONE CYLINDER ONLY | ·IG COIL<br>·SPARK PLUG<br>·COMPRESSION<br>·TAPPET CLEARANCE<br>·INJECTOR |
| 2 | PLURAL CYLINDERS – SUCCESSIVE MISFIRES<br>P0300<br>P0301,2,3,4<br>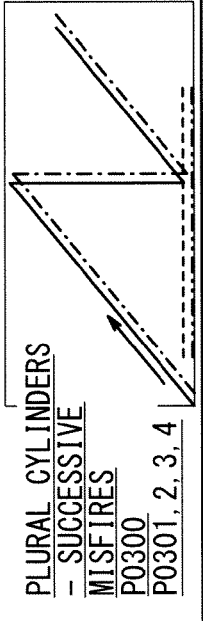 | ·MISFIRING CYLINDERS MISFIRE EVERY TIME AND MISFIRE COUNTER COUNTS UP SUCCESSIVELY (LINEARLY)<br>·MISFIRE COUNTER COUNTS UP FOR PLURAL CYLINDERS | ·IG COIL<br>·SPARK PLUG<br>·COMPRESSION<br>·TAPPET CLEARANCE<br>·INJECTOR |
| 3 | SINGLE CYLINDER – RANDOM MISFIRES<br>P0301,2,3,4<br>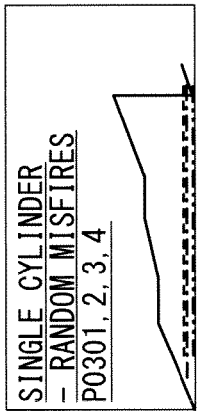 | ·MISFIRING CYLINDERS MISFIRE RANDOMLY (IRREGULARLY) AND OPERATES NORMALLY AND MISFIRE COUNTER COUNTS UP IRREGULARLY<br>·CYLINDER OCCASIONALLY OPERATES NORMALLY AND MISFIRE COUNTER OCCASIONALLY COUNTS UP<br>·MISFIRE COUNTER COUNTS UP FOR ONE CYLINDER ONLY | ·IG COIL<br>·CRANKSHAFT PULSER<br>·CRANKSHAFT SENSOR<br>·VTEC<br>·COMPRESSION<br>·TAPPET CLEARANCE |
| 4 | PLURAL CYLINDERS – RANDOM MISFIRES<br>P0300<br>P0301,2,3,4<br>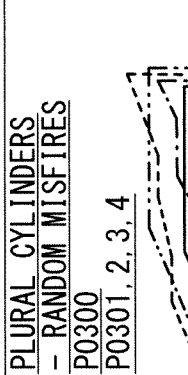 | ·MISFIRING CYLINDERS MISFIRE RANDOMLY (IRREGULARLY) AND OPERATES NORMALLY AND MISFIRE COUNTER COUNTS UP IRREGULARLY<br>·CYLINDERS OCCASIONALLY OPERATE NORMALLY AND MISFIRE COUNTER OCCASIONALLY COUNTS UP<br>·MISFIRE COUNTER COUNTS UP FOR ALL CYLINDERS OR PLURAL CYLINDERS | ·CRANKSHAFT PULSER, CRANKSHAFT SENSOR<br>·EGR VALVE<br>·VTEC<br>·COMPRESSION<br>·TAPPET CLEARANCE<br>·FUEL CHAMBER<br>·FUEL SYSTEM (FUEL PRESSURE, PUMP, FILTER)<br>·ENGINE BODY |

FIG. 8

FAULT DIAGNOSIS METHOD, FAULT DIAGNOSIS SYSTEM, AND FAULT DIAGNOSIS DEVICE FOR ENGINE

TECHNICAL FIELD

The present invention relates to a fault diagnosing method, a fault diagnosing system, and a fault diagnosing machine (device) for engines, which track down a possible faulty region in the event of a misfire occurring in a multicylinder engine that includes a misfire detecting function.

BACKGROUND ART

There has been proposed a diagnostic apparatus for conducting a test to track down a faulty region in a misfiring engine. See, Japanese Laid-Open Patent Publication No. 05-202801 (hereinafter referred to as "JP05-202801A'"). According to JP05-202801A, the diagnostic apparatus detects an air-fuel ratio in a given cylinder, approximately at a time when fuel stops being injected into the cylinder, and determines which one of a fuel injection system and an ignition system is responsible for a misfire in the cylinder based on the detected air-fuel ratio (Abstract). More specifically, according to JP05-202801A, if the fuel injection system is responsible for a misfire and fuel is not properly injected, then the air-fuel ratio remains essentially unchanged approximately at the time that fuel stops being injected into the cylinder. However, if the ignition system is responsible for a misfire and fuel is injected, then the air-fuel ratio changes approximately at the time that fuel stops being injected into the cylinder. Based on such a finding, the diagnostic apparatus can determine which one of the fuel injection system and the ignition system is suffering from a fault (see paragraph "0009").

SUMMARY OF INVENTION

A test for confirming operational states of various parts (function test), as disclosed in JP05-202801A, is highly tedious and time-consuming and hence is of poor efficiency, because the test needs to be conducted on each region that may possibly be responsible for a misfire. In addition, in actuality, such a test tends to make it difficult to perform a diagnosis if the misfire is not repeated or is difficult to repeat.

The present invention has been made in view of the above problems. It is an object of the present invention to provide a fault diagnosing method, a fault diagnosing system, and a fault diagnosing machine for engines, which are capable of greatly reducing the number of man-hours required to identify or confirm a faulty region responsible for a misfire.

According to the present invention, there is provided a fault diagnosing method for diagnosing an engine by tracking down a faulty region in the event of a misfire that occurs in a multicylinder engine having a misfire detecting function, using an external diagnosing machine that communicates with an engine control unit, comprising the steps of reading a diagnostic fault code representative of a misfiring cylinder from the engine control unit into the external diagnosing machine, detecting misfire patterns classified depending on whether or not successive misfires occur in the misfiring cylinder, and tracking down faulty regions according to the detected misfire patterns.

According to the present invention, a misfire pattern of misfires, which are occurring at present or have occurred in the past, is detected, and a faulty region is tracked down according to the detected misfire pattern. Consequently, it is possible to significantly reduce the number of man-hours required to identify or confirm a faulty region.

The external diagnosing machine may display, as the misfire patterns, a graph having a horizontal axis representing time and a vertical axis representing accumulated values of number of misfires. Therefore, the operator can easily identify a misfire pattern by visually confirming the graph. Hence, the operator can easily grasp the situation in relation to misfires that actually are occurring, and classify the misfires as successive misfires or not. Further, the operator can easily grasp an actual diagnostic work technique in relation to judging whether or not successive misfires are occurring, and the result of the diagnostic work technique used to indicate whether or not successive misfires are occurring. Accordingly, the operator can perform work with increased efficiency. In addition, the external diagnosing machine provides a high learning capability for improving the skills of inexperienced operators.

The step of detecting the misfire patterns may comprise the steps of restarting the engine in accordance with an instruction from the external diagnosing machine in an attempt to repeat a misfire in the misfiring cylinder, and if a misfire is not repeated in the misfiring cylinder, detecting the misfire pattern based on successive data generated upon occurrence of a misfire in the misfiring cylinder, which are stored in the engine control unit at a time that the diagnostic fault code is generated. Therefore, even if a misfire is not repeated upon restarting the engine, it is possible to track down faulty regions by using successive data generated upon occurrence of a misfire at a time that the diagnostic fault code is generated.

The step of detecting misfire patterns may comprise the steps of idling the engine in accordance with an instruction from the external diagnosing machine in an attempt to repeat a misfire in the misfiring cylinder, and if a misfire is not repeated in the misfiring cylinder, detecting the misfire pattern by causing a misfire to occur again in the misfiring cylinder by repeating an operating state of the engine, which is stored in the engine control unit at a time that the diagnostic fault code is generated. Therefore, even if it is difficult to repeat a misfire while the engine is idling, it is possible to track down faulty regions by positively causing a misfiring state to occur again.

The fault diagnosing method may further comprise the steps of, if a misfire is repeated in the misfiring cylinder when the engine is restarted in accordance with an instruction from the external diagnosing machine, cranking the engine to rotate a crankshaft while canceling fuel explosion in cylinders of the engine, detecting variations in angular velocity of the crankshaft while the engine is being cranked, and determining a cylinder, which has variations in angular velocity that are equal to or smaller than a predetermined value, as a compression pressure shortage cylinder that suffers from a shortage of compression pressure, and successively changing air-fuel ratios of fuel supplied to the cylinders while the engine is not under a load, and judging an air-fuel ratio failure based on a degree of occurrence of a misfire in the cylinders, thereby further tracking down faulty regions. Accordingly, it is possible, from among faulty regions that have already been tracked down based on the misfire pattern, to further track down significantly limited faulty regions, by determining a compression pressure shortage cylinder and an air-fuel ratio failure. Consequently, it is possible to further reduce the number of man-hours required to identify or confirm a faulty region.

The misfire patterns may represent successive misfires in a single cylinder, successive misfires in plural cylinders, random misfires in a single cylinder, and random misfires in plural cylinders. Therefore, it is possible to easily classify the misfire patterns and to efficiently track down a faulty region.

According to the present invention, there also is provided a fault diagnosing system for diagnosing an engine, comprising an engine control unit for detecting a misfire occurring in an engine having a plurality of cylinders and storing a diagnostic fault code representative of a misfiring cylinder, and an external diagnosing machine for tracking down faulty regions responsible for the misfire, wherein the external diagnosing machine acquires the diagnostic fault code from the engine control unit and provides guidance concerning a diagnostic work technique that depends on the diagnostic fault code, and the external diagnosing machine detects misfire patterns classified depending on whether or not successive misfires occur in the misfiring cylinder, and tracks down and displays faulty regions according to the detected misfire patterns.

According to the present invention, there is further provided a fault diagnosing machine for diagnosing an engine having a plurality of cylinders by tracking down faulty regions responsible for a misfire that occurs in the engine, wherein successive data upon occurrence of a misfire in a misfiring cylinder are acquired directly or indirectly from a vehicle, misfire patterns, which are classified depending on whether or not successive misfires occurs in the misfiring cylinder, are detected based on the successive data, and faulty regions are tracked down according to the detected misfire patterns.

BRIEF DESCRIPTION OF DRAWINGS

FIG. 8 is a diagram showing by way of example a plurality of misfire patterns with corresponding misfire details, and possible faulty regions displayed in a specific work display area;

DESCRIPTION OF EMBODIMENTS

A. Embodiment
1. Arrangement
(1) Overall Configuration

Figure 1:
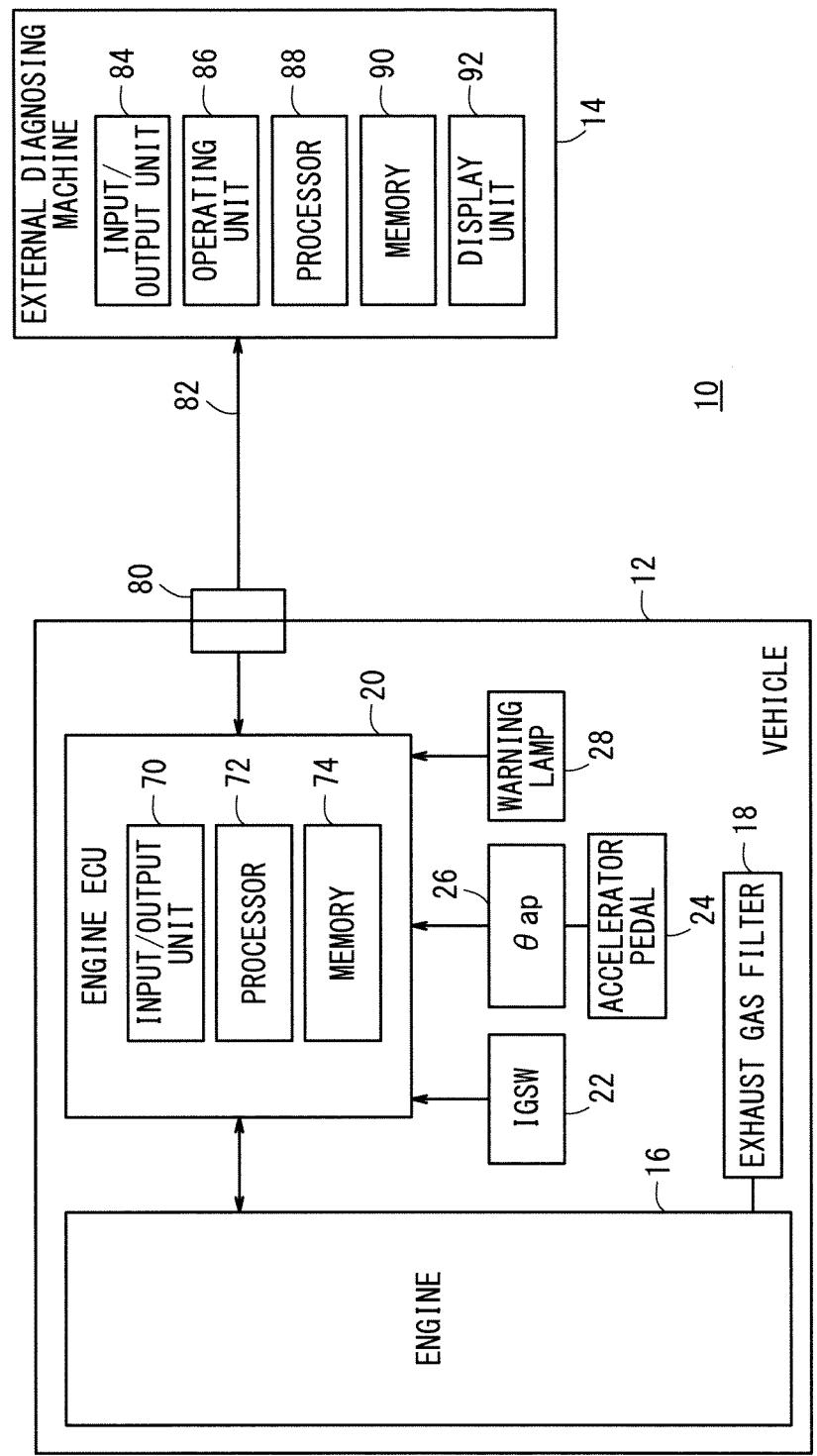
FIG. 1 is a block diagram showing a general configuration of a fault diagnosing system according to an embodiment of the present invention.

FIG. 1 is a block diagram showing the general configuration of an engine diagnosing system 10 (hereinafter referred to simply as a "system 10") according to an embodiment of the present invention. The system 10 includes a vehicle 12, which incorporates an engine 16 as a target to be diagnosed, and an external diagnosing machine 14 (hereinafter also referred to as a "diagnosing machine 14") for diagnosing the engine 16.

(2) Vehicle 12
(a) Overall Configuration

The vehicle 12 includes, in addition to the engine 16, an exhaust gas filter 18 (hereinafter also referred to as a "filter 18") for purifying exhaust gases emitted from the engine 16, an engine electronic control unit 20 (hereinafter referred to as an "engine ECU 20" or an "ECU 20") for controlling operation of the engine 16, an ignition switch 22 (hereinafter referred to by "IGSW 22"), an accelerator pedal 24, a depressed angle sensor 26 for detecting a depressed angle Bap of the accelerator pedal 24, and a warning lamp 28.

(b) Engine 16

Figure 2:
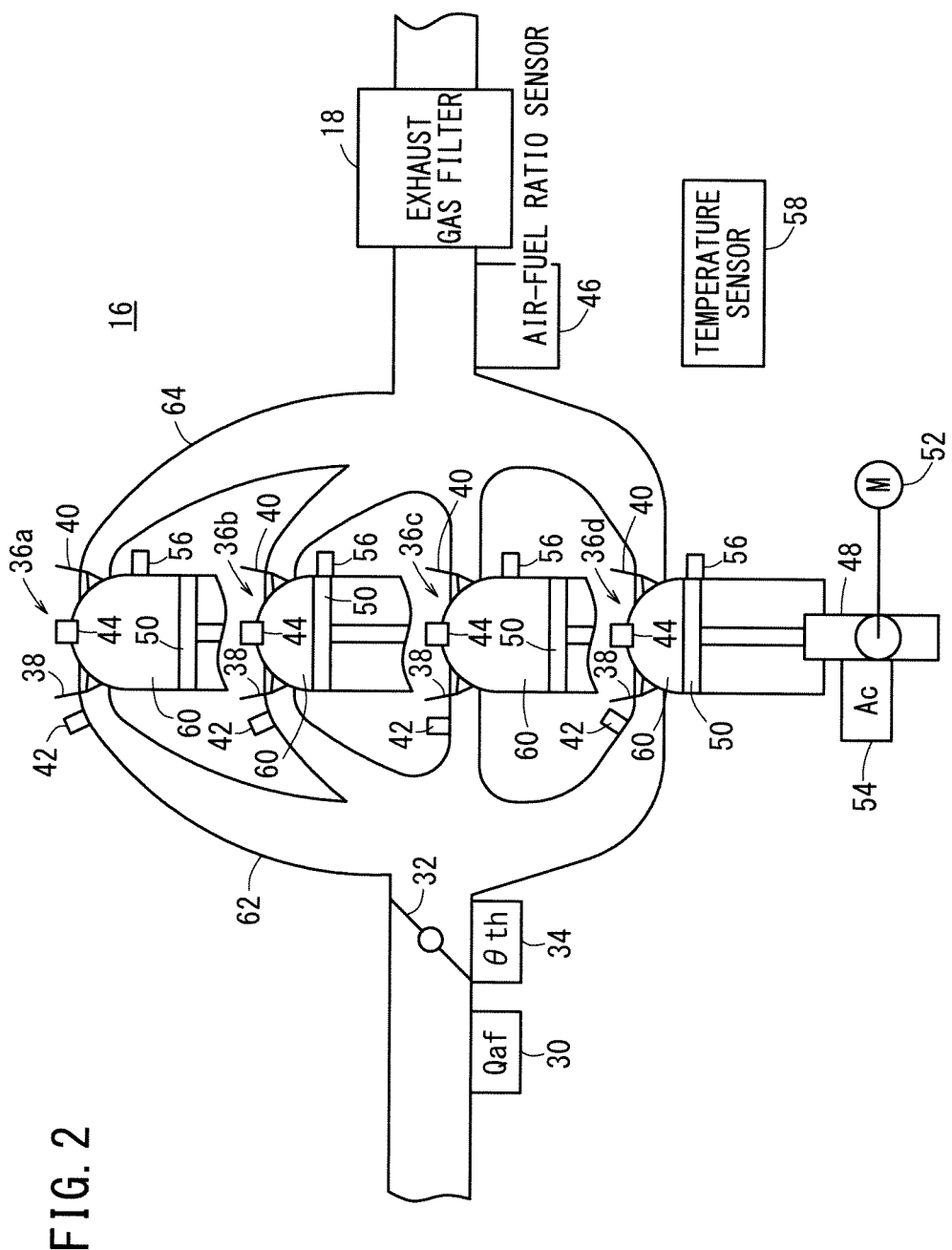
FIG. 2 is a view showing a general internal structure of an engine.

FIG. 2 shows a general internal structure of the engine 16. As shown in FIG. 2, the engine 16 comprises a so-called in-line four-cylinder engine having an amount-of-intake-air sensor 30, a throttle valve 32, a degree-of-opening sensor 34, first through fourth cylinders 36a through 36d (hereinafter referred to collectively as "cylinders 36"), intake valves 38, exhaust valves 40, fuel injection valves 42, spark plugs 44, an air-fuel-ratio sensor 46, a crankshaft 48, pistons 50, a starter motor 52, a crankshaft angle sensor 54, top-dead-center sensors 56, and a temperature sensor 58. The intake valves 38, the exhaust valves 40, and the spark plugs 44 are disposed in facing relation to combustion chambers 60 of the cylinders 36a through 36d.

The amount-of-intake-air sensor 30 detects an amount of air (hereinafter referred to as "an amount of intake air Qaf") that is drawn into the engine 16 depending on a degree of opening θth [°] of the throttle valve 32, and outputs the detected amount of intake air Qaf to the engine ECU 20. The throttle valve 32 is disposed in an intake manifold 62. The degree-of-opening sensor 34 detects the degree of opening θth of the throttle valve 32, and outputs the detected degree of opening θth to the engine ECU 20. The fuel injection valves 42 and the spark plugs 44 are disposed in facing relation to the combustion chambers 60 of the cylinders 36a through 36d. The air-fuel-ratio sensor 46, which includes a non-illustrated oxygen sensor, is disposed in an exhaust manifold 64. The air-fuel-ratio sensor 46 detects an air-fuel ratio (hereinafter referred to as a "total air-fuel ratio Raf_total") of the engine 16 in its entirety, and outputs the detected total air-fuel ratio Raf_total to the engine ECU 20.

The starter motor 52 actuates the crankshaft 48 based on electric power supplied from a battery, not shown. The crankshaft angle sensor 54 detects a rotational angle (hereinafter referred to as a "crankshaft angle Ac") [°] of the crankshaft 48, and outputs the detected crankshaft angle Ac to the engine ECU 20. Each of the top-dead-center sensors 56 detects a top dead center position of a corresponding piston 50, and outputs the detected top dead center position to the engine ECU 20. The temperature sensor 58 detects a temperature Tw [° C.] of an engine coolant, not shown, and outputs the detected temperature Tw to the engine ECU 20. The temperature sensor 58 may detect the temperature To [° C.] of an engine oil, not shown.

(c) Exhaust Gas Filter 18

The exhaust gas filter 18, which is disposed downstream (on the exhaust side) from the exhaust manifold 64, purifies exhaust gases from the engine 16 and discharges the purified exhaust gases. According to the present embodiment, the exhaust gas filter 18 includes a three-way catalyst for purifying exhaust gases.

(d) Engine ECU 20

The engine ECU 20 serves to control operations of the engine 16. As shown in FIG. 1, the engine ECU 20 has an input/output unit 70, a processor 72, and a memory 74.

According to the present embodiment, the engine ECU 20 includes and carries out an engine rotational speed calculating function, a misfire counting function, a throttle valve controlling function, a fuel injection valve controlling function, and a spark plug controlling function, for example.

The engine rotational speed calculating function is a function to calculate a rotational speed (engine rotational speed NE) [rpm] of the engine 16 based on output signals from the top-dead-center sensors 56. According to the present embodiment, the engine rotational speed calculating function is combined with the top-dead-center sensors 56 in order to provide an engine rotational speed sensor. Alternatively, an engine rotational speed sensor may be provided independently of the engine ECU 20, and an output signal from the engine rotational speed sensor may be sent to the engine ECU 20.

The misfire counting function is a function to judge whether or not a misfire is occurring in each of the cylinders 36a through 36d based on output signals from the crankshaft angle sensor 54, and to count misfires that have been judged as occurring in each of the cylinders 36a through 36d. According to the present embodiment, the misfire counting function is combined with the crankshaft angle sensor 54 in order to provide a misfire counter. A misfire may be judged as occurring by known means. For example, a combustion pressure at a given crankshaft angle may be detected, and a misfire may be judged as occurring if the detected combustion pressure is equal to or lower than a predetermined value. Alternatively, a misfire may be judged as occurring if a combustion pressure at a given crankshaft angle is equal to or lower than a predetermined value.

The throttle valve controlling function is a function to control the output power of the engine 16 by controlling a degree of opening θth of the throttle valve 32, based on the depressed angle θap of the accelerator pedal 24 or the like.

The fuel injection controlling function is a function to control the output power of the engine 16 by controlling an injected amount of fuel Qfi (target value) from the fuel injection valve 42 based on the depressed angle θap of the accelerator pedal 24 or the like.

The spark plug controlling function is a function to control the output power of the engine 16 by controlling an ignition timing of each of the spark plugs 44 based on the depressed angle θap of the accelerator pedal 24 or the like.

(3) External Diagnosing Machine 14

The external diagnosing machine 14 serves to diagnose the engine 16 for faults. As shown in FIG. 1, the external diagnosing machine 14 includes a cable 82, which is connected to the engine ECU 20 through a data link connector 80 on the vehicle 12 for inputting and outputting intravehicular data, an input/output unit 84 to which the cable 82 is connected, an operating unit 86 in the form of a keyboard, a touch pad, etc., not shown, a processor 88 for controlling various components and judging each of the cylinders 36a through 36d for a malfunction, a memory 90 for storing various data together with various programs including a control program used by the processor 88 and a fault diagnosing program, and a display unit 92 for displaying various items of information.

The external diagnosing machine 14 may be made up of hardware in the form of a commercially available laptop computer, a tablet computer, or a smartphone, for example.

For diagnosing the respective cylinders 36a through 36d for faults using the external diagnosing machine 14, an operator (user) connects one end of the cable 82 to the input/output unit 84 and the other end of the cable 82 to the data link connector 80, which is mounted on an instrument panel, not shown, of the vehicle 12. Thereafter, the operator operates the operating unit 86 in order to instruct the external diagnosing machine 14 to diagnose the respective cylinders 36a through 36d for faults. The external diagnosing machine 14 causes the engine ECU 20 to operate the engine 16. Details of a process, which is carried out by the external diagnosing machine 14 in order to diagnose the respective cylinders 36a through 36d for faults, will be described later.

Figure 3:
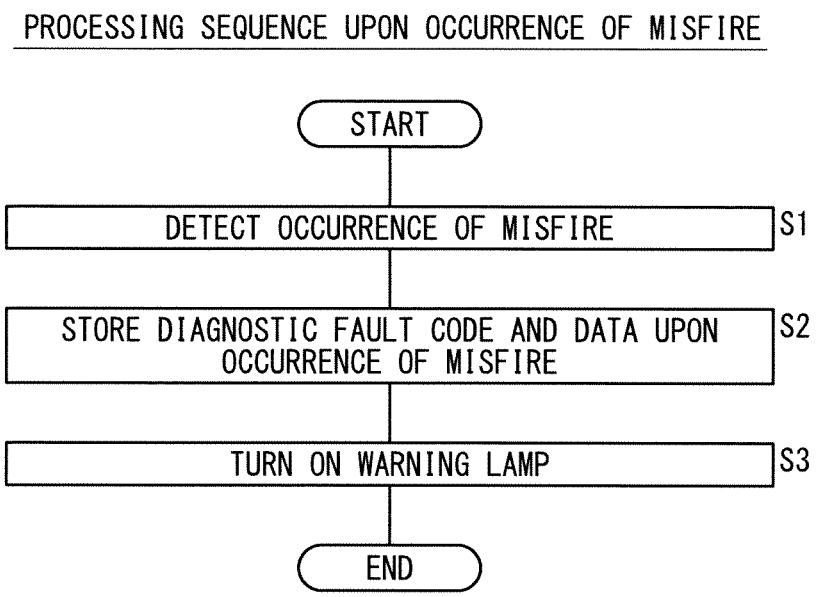
FIG. 3 is a flowchart of a processing sequence, which is carried out when a misfire occurs in the engine while a vehicle powered by an engine is traveling normally (while the engine is operating normally)

2. Diagnosis Upon the Occurrence of a Misfire (1) Processing Sequence Carried Out When a Misfire Occurs FIG. 3 is a flowchart of a processing sequence, which is carried out when a misfire occurs in the engine 16 while the vehicle 12 is traveling normally (while the engine 16 is operating normally). In step S1, the engine ECU 20 detects, by way of the misfire counter, a misfire that occurs in the engine 16.

In step S2, the engine ECU 20 stores in the memory 74 a diagnostic fault code representative of the occurrence of a misfire, and one of the cylinders 36a through 36d that has suffered from the misfire. For example, if a misfire has occurred in the first cylinder 36a, then the engine ECU 20 stores a diagnostic fault code "P0301" in the memory 74. If a misfire has occurred in the second cylinder 36b, then the engine ECU 20 stores a diagnostic fault code "P0302" in the memory 74. If a misfire has occurred in the third cylinder 36c, then the engine ECU 20 stores a diagnostic fault code "P0303" in the memory 74. If a misfire has occurred in the fourth cylinder 36d, then the engine ECU 20 stores a diagnostic fault code "P0304" in the memory 74. If multiple cylinders 36a through 36d have misfired, then the engine ECU 20 stores a diagnostic fault code "P0300" in the memory 74.

Data, which is available for 15 seconds immediately before the engine ECU 20 judges that a misfire has occurred, are acquired at intervals of 0.2 seconds as relevant data in relation to the occurrence of a misfire. The acquired data include data representing a vehicle speed V [km/h], an engine rotational speed NE [rpm], a temperature Tw [° C.] of the coolant of the engine 16, a depressed angle bap of the accelerator pedal 24, and a number of misfires that have occurred in the cylinders 36a through 36d within a predetermined period (measurement period Pm, to be described later).

In step S3, the engine ECU 20 issues a warning by turning on the warning lamp 28, thereby indicating to the user the occurrence of a fault (misfire). In response to the warning, the user takes the vehicle 12 to a repair shop or the like, for example.

(2) Processing Sequence for Diagnosing Engine 16 in the Event of a Misfire

Figure 4:
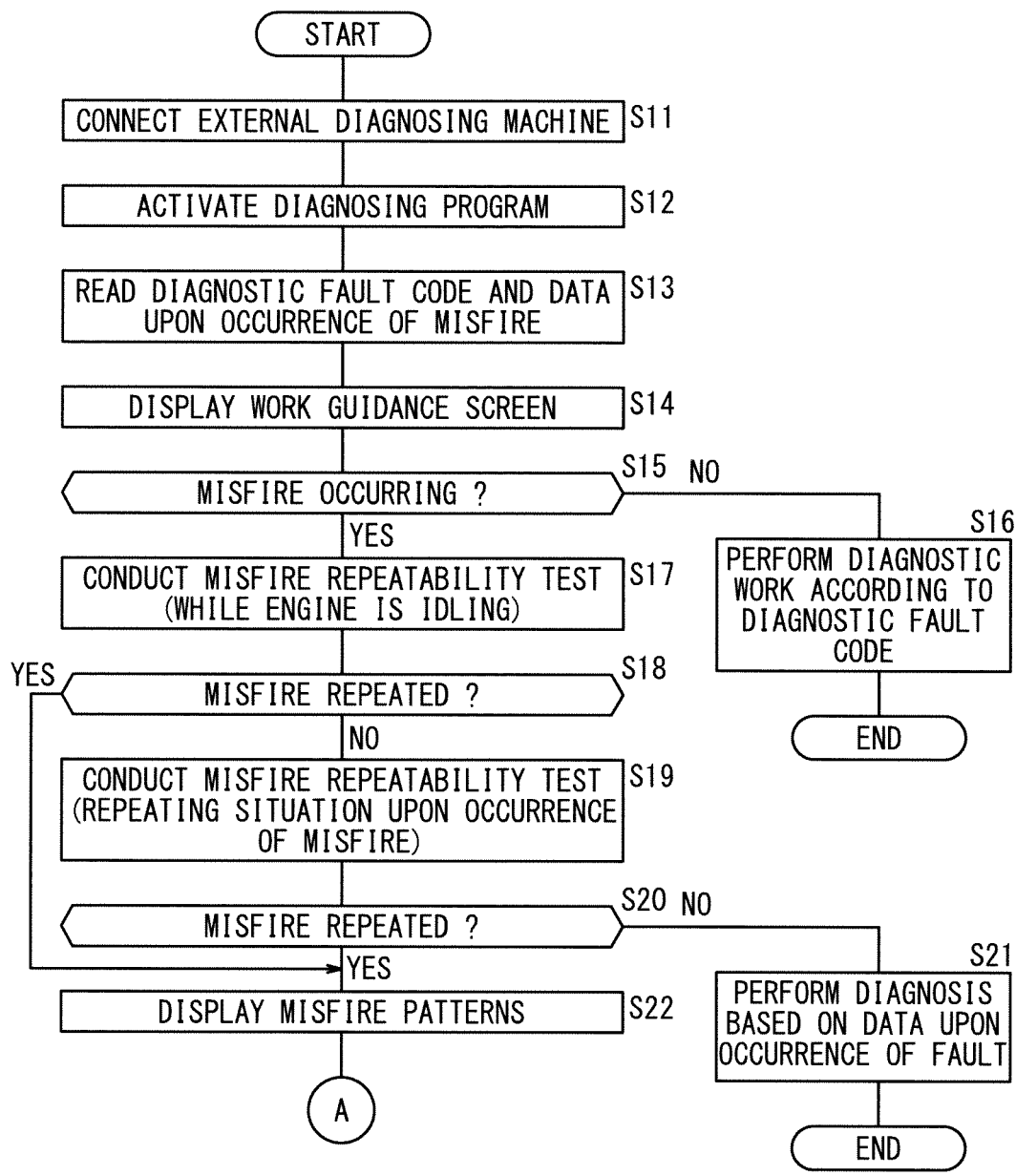
FIG. 4 is a first flowchart of a processing sequence for diagnosing the engine in the event of a misfire.
Figure 5:
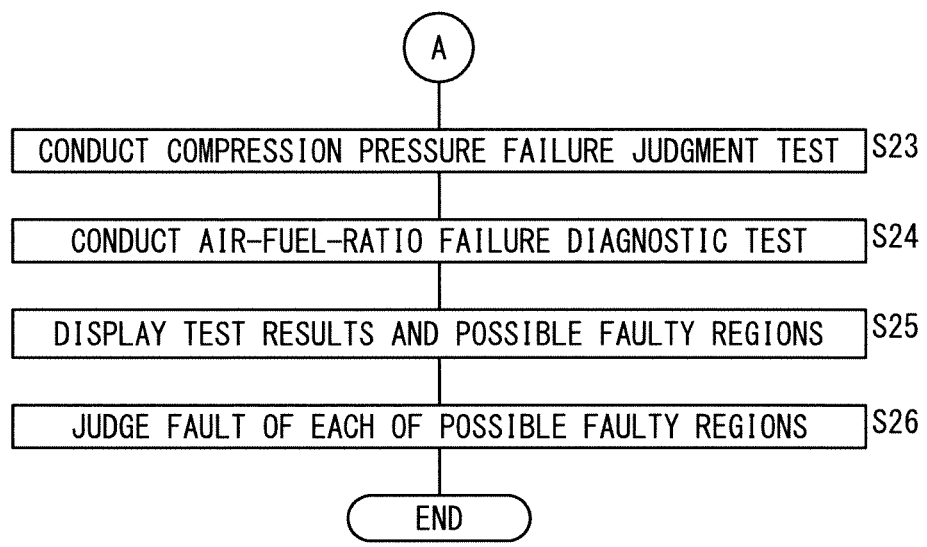
FIG. 5 is a second flowchart of a processing sequence for diagnosing the engine in the event of a misfire.

FIGS. 4 and 5 show first and second flowcharts, respectively, of a processing sequence for diagnosing the engine 16 in the event of a misfire. In step S11, an operator (technician), having confirmed that the warning lamp 28 on the vehicle 12 is turned on, connects the external diagnosing machine 14 to the engine ECU 20 through the cable 82 and the data link connector 80. In step S12, the processor 88 of the external diagnosing machine 14 reads a diagnostic program from the memory 90 in response to an action made by the operator, and activates the diagnostic program. In step S13, the operator carries out an operation, using the operating unit 86 of the external diagnosing machine 14, in order to read data and a diagnostic fault code (DTC) into the external diagnosing machine 14 upon the occurrence of a fault in the engine ECU 20.

Figure 6:
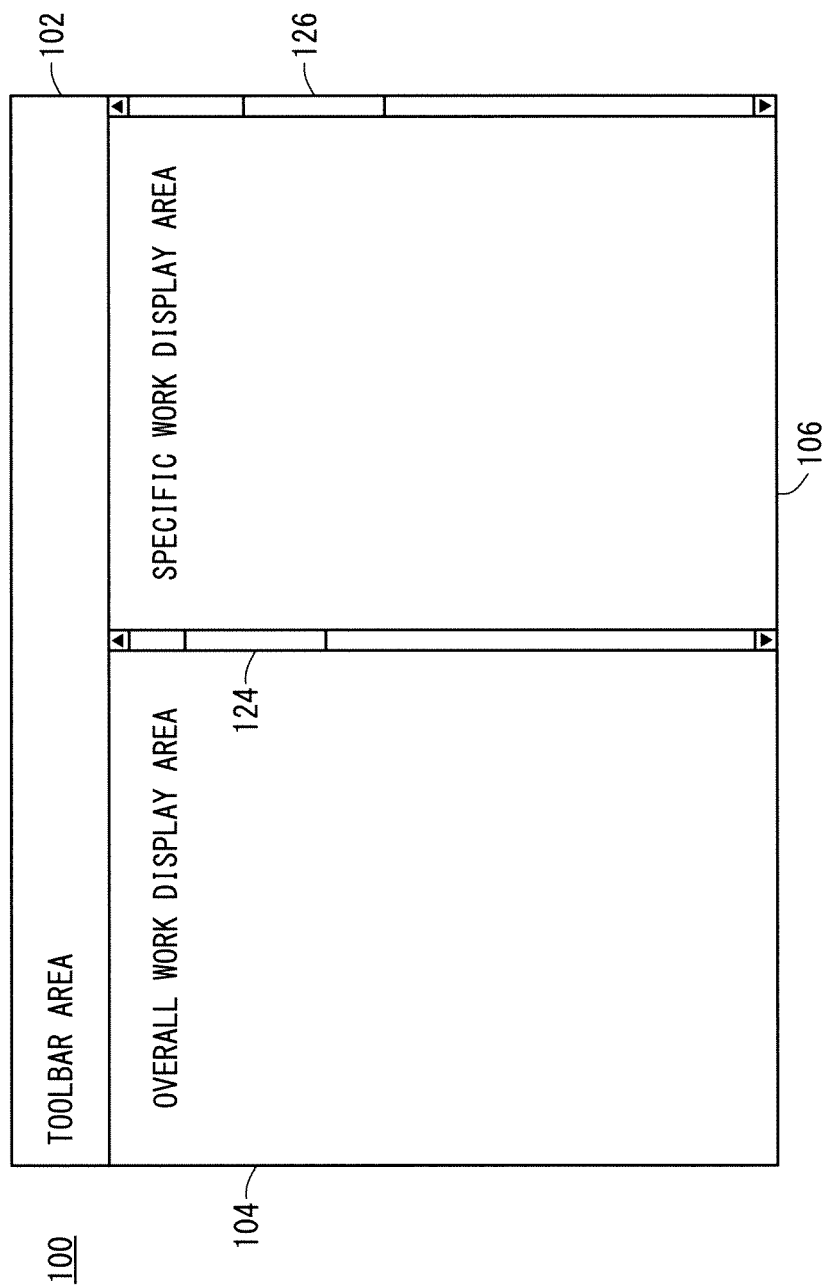
FIG. 6 is a view showing positions of areas of a work guidance screen displayed upon diagnosis of the engine.

In step S14, the external diagnosing machine 14 displays a work guidance screen for diagnostic work, which corresponds to the read diagnostic fault code. FIG. 6 is a view showing positions of areas of a work guidance screen 100, which are displayed when the engine 16 is diagnosed. As shown in FIG. 6, the work guidance screen 100 primarily is made up of a toolbar area 102, an overall work display area 104, and a specific work display area 106.

The toolbar area 102 is an area for displaying a tool bar, not shown, including icons "SAVE", "PRINT", etc. The overall work display area 104 is an area for displaying an overall work flowchart 110 (see FIG. 7), which depends on the diagnostic fault code read in step S13. The specific work display area 106 is an area for displaying specific work details, which depend on a work title (work item) selected in the overall work flowchart 110.

Figure 7:
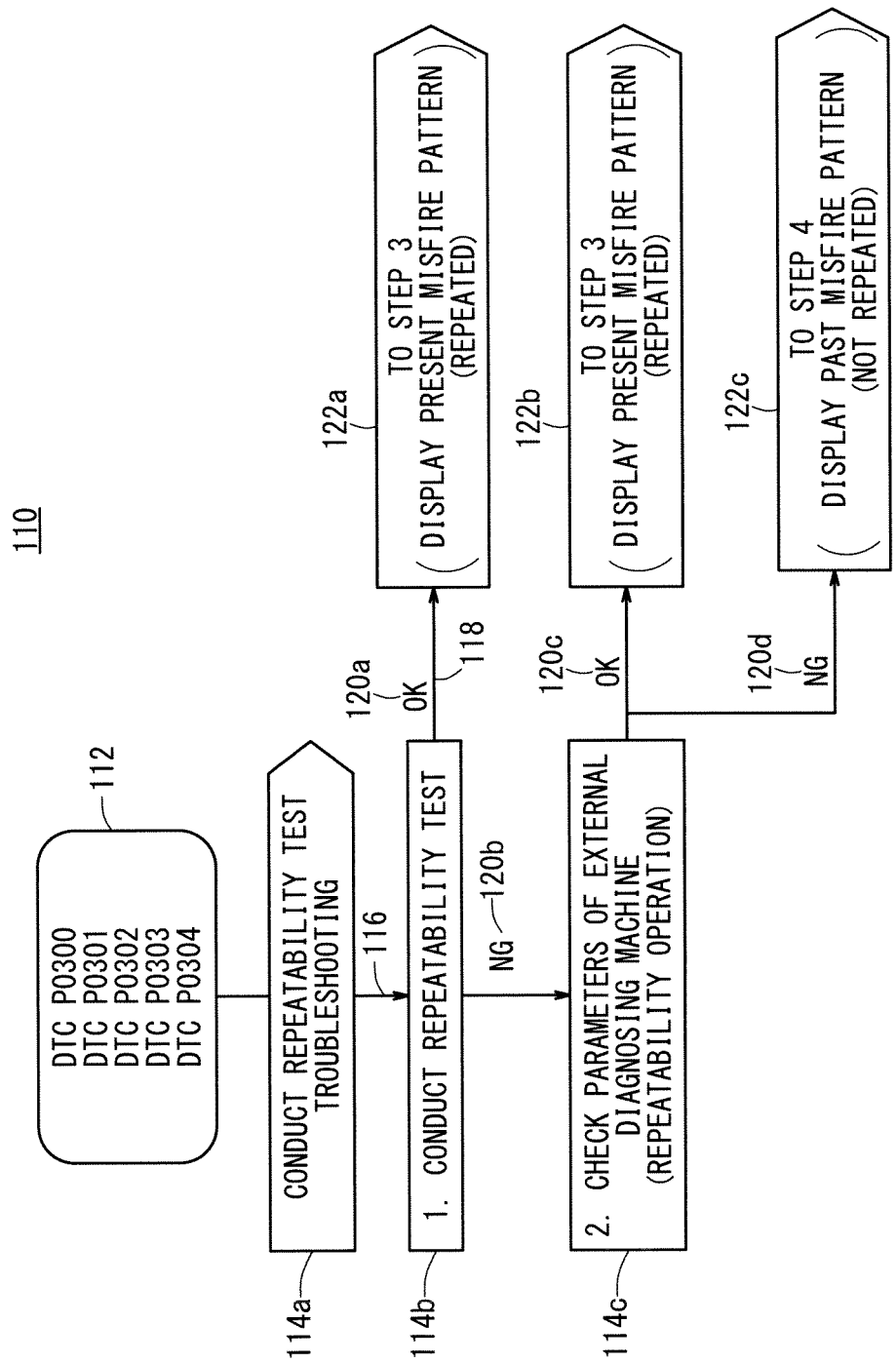
FIG. 7 is a diagram showing by way of example an overall work flowchart, which is displayed in an overall work display area.

FIG. 7 shows by way of example the overall work flowchart 110 displayed in the overall work display area 104. As shown in FIG. 7, the overall work flowchart 110 has a start box 112, first through third work title boxes 114a through 114c (hereinafter collectively referred to as "work title boxes 114"), a plurality of vertical arrows 116, a plurality of horizontal arrows 118, first through fourth check result boxes 120a through 120d (hereinafter referred to collectively as "check result boxes 120"), first through third skip boxes 122a through 122c (hereinafter referred to as "skip boxes 122"), a first scroll bar 124, and a second scroll bar 126 (see FIG. 6).

The start box 112 is a field for displaying a diagnostic fault code or symptom. According to the present embodiment, the diagnostic fault codes include codes such as "P0300", "P0301", "P0302", "P0303", "P0304" (indicative of the occurrence of a misfire in the engine 16).

The work title boxes 114 are fields for displaying work titles (work items). The work titles (work items) include a diagnostic work item and a verifying work item. The diagnostic work item is a work item for identifying a faulty region, and the verifying work item is a work item for repairing or replacing the identified faulty region. In FIG. 7, the first work title box 114a, which has a pentagonal shape, represents an overall work item, and the second and third work title boxes 114b, 114c, which have rectangular shapes, represent individual work items.

The vertical arrows 116 and the horizontal arrows 118 point to work title boxes 114a and skip boxes 122, which are proceeded to in a subsequent step.

The check result boxes 120 are fields for displaying a check result, i.e., "OK" (repeated or normal) or "NG" (not repeated or abnormal). Since the check result boxes 120 have a transparent background and a transparent frame, only the letters in the check result boxes 120 are illustrated in FIG. 7.

The skip boxes 122 are fields for displaying a skip from one work title box 114 to another work title box 114.

The first scroll bar 124 (FIG. 6) is a scroll bar for vertically scrolling the overall work flowchart 110 displayed in the overall work display area 104. If the overall work flowchart 110 cannot be displayed in its entirety within the overall work display area 104 shown in FIG. 6, then the operator can move the first scroll bar 124 in order to vertically scroll the overall work flowchart 110, so that the operator can see the overall work flowchart 110 in its entirety.

The second scroll bar 126 (FIG. 6) is a scroll bar for vertically scrolling the specific work details displayed in the specific work display area 106. If the specific work details cannot be displayed in their entirety within the specific work display area 106 shown in FIG. 6, then the operator can move the second scroll bar 126 in order to vertically scroll the specific work details (see FIG. 8, for example), so that the operator can see the specific work details in their entirety.

The work guidance screen 100 may have a scroll bar for horizontally scrolling the displayed information, in addition to the first scroll bar 124 and the second scroll bar 126, which serve to vertically scroll the displayed information.

A work title box 114 to be handled, i.e., any work item to be dealt with, has a frame thereof displayed in bold, so that the display of the work title box 114 to be handled is highlighted. For example, if the second work title box 114b ("REPEATABILITY TEST") is to be handled, then the second work title box 114b is highlighted with the frame thereof displayed in bold. Alternatively, if the work guidance screen 100 is displayed in color, then the background color of any work title box 114 may be changed from blue to orange, for example, so that the display of the work title box 114 is highlighted.

In step S15 of FIG. 4, the operator judges whether or not the read diagnostic fault code represents the occurrence of a misfire. If the diagnostic fault code does not represent the occurrence of a misfire (S15: NO), then in step S16, the operator carries out a diagnostic process in accordance with the diagnostic fault code.

If the diagnostic fault code represents the occurrence of a misfire (S15: YES), then in step S17, the external diagnosing machine 14 keeps the engine 16 idling, and conducts a misfire repeatability test on all of the cylinders 36a through 36d. In the misfire repeatability test of step S17, a misfire is judged as being repeated when the warning lamp 28, which indicates the occurrence of a misfire, is turned on while the engine 16 is idling. The operator selects one of the skip boxes 122 from within the overall work flowchart 110 in order to enter the result of the misfire repeatability test. Thereafter, the external diagnosing machine 14 guides the operator to perform a work process depending on the entered result of the misfire repeatability test. Alternatively, rather than the operator entering the result of the misfire repeatability test, the external diagnosing machine 14 may judge whether or not a misfire is repeated. More specifically, the external diagnosing machine 14 keeps the engine 16 idling while measuring with the misfire counter an accumulated value Tmf_cyl_n of the number of misfires that have occurred in the respective cylinders 36a through 36d during a measurement period Pm. The variable "n" in "Tmf_cyl_n" represents the number of a cylinder in question. For example, "Tmf_cyl_1" represents an accumulated value with respect to the first cylinder 36a. The external diagnosing machine 14 judges that a misfire is repeated when the accumulated value "Tmf_cyl_n" with respect to at least one cylinder exceeds a given threshold value for judging the occurrence of a misfire.

If a misfire is repeated while the engine 16 is idling (S18: YES), then control proceeds to step S22. If a misfire is not repeated while the engine 16 is idling (S18: NO), then in step S19, the external diagnosing machine 14 conducts a misfire repeatability test on all of the cylinders 36a through 36d while the fault that has occurred is being repeated. The misfire repeatability test in step S19 is the same as the misfire repeatability test in step S17, except that the step is performed while the fault that has occurred is being repeated, rather than while the engine 16 is idling. More specifically, the external diagnosing machine 14 displays, within the specific work display area 106, a message which requests the operator to repeat the occurrence of the fault, and to acquire data upon occurrence of a misfire, together with the data that was read upon the occurrence of the fault in step S13. The data upon occurrence of the fault include data representative of a vehicle speed V [km/h], an engine rotational speed NE [rpm], a temperature Tw [° C.] of the coolant of the engine 16, and a depressed angle θap of the accelerator pedal 24, for example. Based on the message and the data, which are displayed in the specific work display area 106, the operator repeats the occurrence of the fault. If a misfire is repeated at this time, then the warning lamp 28 is turned on in order to indicate the occurrence of a misfire. Depending on whether or not the warning lamp 28 is turned on, the operator judges whether a misfire is repeated, and selects one of the skip boxes 122 from within the overall work flowchart 110 in order to enter the result of the misfire repeatability test. Alternatively, in the same manner as in step S17, the external diagnosing machine 14 may operate autonomously to judge whether or not a misfire is repeated.

If a misfire is repeated while the fault that has occurred is repeated (S20: YES), then control proceeds to step S22. If a misfire is not repeated while the fault that has occurred is repeated (S20: NO), then in step S21, the external diagnosing machine 14 displays a list of misfire-related fault data in the past, together with details of the misfire-related fault data in the past selected from the list displayed on the display unit 92. The operator can now identify a faulty region based on the misfire-related fault data in the past. The misfire-related fault data in the past are stored in the memory 90.

In step S22, the external diagnosing machine 14 displays misfire patterns of the cylinders 36a through 36d on the display unit 92. FIG. 8 is a diagram showing by way of example a plurality of misfire patterns together with corresponding misfire details and possible faulty regions that are displayed in the specific work display area 106.

In FIG. 8, the misfire patterns include a misfire pattern 1 in which a single cylinder suffers from a succession of misfires (SINGLE CYLINDER—SUCCESSIVE MISFIRES), a misfire pattern 2 in which a plurality of cylinders suffer from a succession of misfires (PLURAL CYLINDERS—SUCCESSIVE MISFIRES), a misfire pattern 3 in which a single cylinder randomly misfires (SINGLE CYLINDER—RANDOM MISFIRES), and a misfire pattern 4 in which a plurality of cylinders randomly misfire (PLURAL CYLINDERS—RANDOM MISFIRES).

The misfire pattern 1 (SINGLE CYLINDER—SUCCESSIVE MISFIRES) is combined with a field "MISFIRE DETAILS (MISFIRE SYMPTOM)" which displays a statement "MISFIRING CYLINDER MISFIRES EVERY TIME AND MISFIRE COUNTER COUNTS UP SUCCESSIVELY (LINEARLY)" and a statement "MISFIRE COUNTER COUNTS UP FOR ONE CYLINDER ONLY" while also displaying a graph of the misfire pattern 1 (SINGLE CYLINDER—SUCCESSIVE MISFIRES) the horizontal axis of which represents time (MEASURING TIME) and the vertical axis of which represents an accumulated value Tmf_cyl_n of the number of misfires (MISFIRE COUNTER [COUNT]). The misfire pattern 1 also is combined with a field "POSSIBLE FAULTY REGION" which displays "IG (ignition) COIL", "SPARK PLUG", "COMPRESSION" (compression failure), "TAPPET CLEARANCE" (valve clearance), and "INJECTOR", as regions that potentially are suffering from a fault according to the misfire pattern 1.

The misfire pattern 2 (PLURAL CYLINDERS—SUCCESSIVE MISFIRES) is combined with a field "MISFIRE DETAILS (MISFIRE SYMPTOM)" which displays a statement "MISFIRING CYLINDERS MISFIRE EVERY TIME AND MISFIRE COUNTER COUNTS UP SUCCESSIVELY (LINEARLY)" and a statement "MISFIRE COUNTER COUNTS UP FOR PLURAL CYLINDERS", and also displays a graph of the misfire pattern 2 (PLURAL CYLINDERS—SUCCESSIVE MISFIRES) the horizontal axis of which represents time and the vertical axis of which represents an accumulated value Tmf_cyl_n of the number of misfires. The misfire pattern 2 also is combined with a field "POSSIBLE FAULTY REGION" which displays "IG COIL", "SPARK PLUG", "COMPRESSION", "TAPPET CLEARANCE", and "INJECTOR", as regions that potentially are suffering from a fault according to the misfire pattern 2.

The misfire pattern 3 (SINGLE CYLINDER—RANDOM MISFIRES) is combined with a field "MISFIRE DETAILS (MISFIRE SYMPTOM)" which displays a statement "MISFIRING CYLINDERS MISFIRE RANDOMLY (IRREGULARLY) AND OPERATES NORMALLY AND MISFIRE COUNTER COUNTS UP IRREGULARLY", a statement "CYLINDER OCCASIONALLY OPERATES NORMALLY AND MISFIRE COUNTER OCCASIONALLY COUNTS UP", and a statement "MISFIRE COUNTER COUNTS UP FOR ONE CYLINDER ONLY", and also displays a graph of the misfire pattern 3 (SINGLE CYLINDER—RANDOM MISFIRES) the horizontal axis of which represents time and the vertical axis of which represents an accumulated value Tmf_cyl_n of the number of misfires. The misfire pattern 3 also is combined with a field "POSSIBLE FAULTY REGION" which displays "IG COIL", "CRANKSHAFT PULSER", "CRANKSHAFT SENSOR", "VTEC" (variable valve timing/valve lifting mechanism), "COMPRESSION", and "TAPPET CLEARANCE", as regions that potentially are suffering from a fault according to the misfire pattern 3.

The misfire pattern 4 (PLURAL CYLINDERS—RANDOM MISFIRES) is combined with a field "MISFIRE DETAILS (MISFIRE SYMPTOM)" which displays a statement "MISFIRING CYLINDERS MISFIRE RANDOMLY (IRREGULARLY) AND OPERATES NORMALLY AND MISFIRE COUNTER COUNTS UP IRREGULARLY", a statement "CYLINDERS OCCASIONALLY OPERATE NORMALLY AND MISFIRE COUNTER OCCASIONALLY COUNTS UP", and a statement "MISFIRE COUNTER COUNTS UP FOR ALL CYLINDERS OR PLURAL CYLINDERS", and also displays a graph of the misfire pattern 4 (PLURAL CYLINDERS—RANDOM MISFIRES) the horizontal axis of which represents time and the vertical axis of which represents an accumulated value Tmf_cyl_n of the number of misfires. The misfire pattern 4 also is combined with a field "POSSIBLE FAULTY REGION" which displays "CRANKSHAFT PULSER", "CRANKSHAFT SENSOR", "EGR VALVE", "VTEC", "COMPRESSION", "TAPPET CLEARANCE", "FUEL CHAMBER", "FUEL SYSTEM" (FUEL PRESSURE, PUMP, FILTER), and "ENGINE BODY" as regions that potentially are suffering from a fault according to the misfire pattern 4.

The displayed information shown in FIG. 8 is used as a guideline for the operator to judge the misfire pattern. In addition to the displayed information shown in FIG. 8, the external diagnosing machine 14 displays, in the specific work display area 106, graphs (not shown, identical to those shown in FIG. 8) of the accumulated values Tmf_cyl_n of the present number of misfires occurring in the respective cylinders 36a through 36d. If a misfire is repeated while the engine 16 is idling (S18: YES), then data acquired up to that time are used as the accumulated values Tmf_cyl_n of the present number of misfires. If a misfire is not repeated while the engine 16 is idling (S18: NO), then data upon the occurrence of the misfire are used as the accumulated values Tmf_cyl_n of the present number of misfires. In addition, misfire pattern options are displayed in the specific work display area 106.

Based on the displayed information shown in FIG. 8 and the graphs of the accumulated values Tmf_cyl_n of the present number of misfires, the operator selects one of the misfire pattern options using the operating unit 86. In this manner, a misfire pattern is selected.

In step S23 shown in FIG. 5, the external diagnosing machine 14 conducts a compression pressure failure judgment test. The compression pressure failure judgment test is a test for judging a compression pressure failure in the cylinders 36a through 36d, and is capable of determining whether or not a mechanical system fault is occurring, as will be described in detail later.

In step S24, the external diagnosing machine 14 conducts an air-fuel-ratio failure diagnostic test. The air-fuel-ratio failure diagnostic test is a test for diagnosing an air-fuel-ratio failure in the cylinders 36a through 36d, and is capable of determining a lean failure in which the air-fuel ratio is excessively low, and a rich failure in which the air-fuel ratio is excessively high.

In step S25, the external diagnosing machine 14 tracks down regions (hereinafter referred to as "possible faulty regions") where a fault possibly is occurring based on the results of the misfire repeatability test (S17, S19), the compression pressure failure judgment test (S23), and the air-fuel-ratio failure diagnostic test (S24), and displays the possible faulty region along with the results of the tests.

Figure 9:
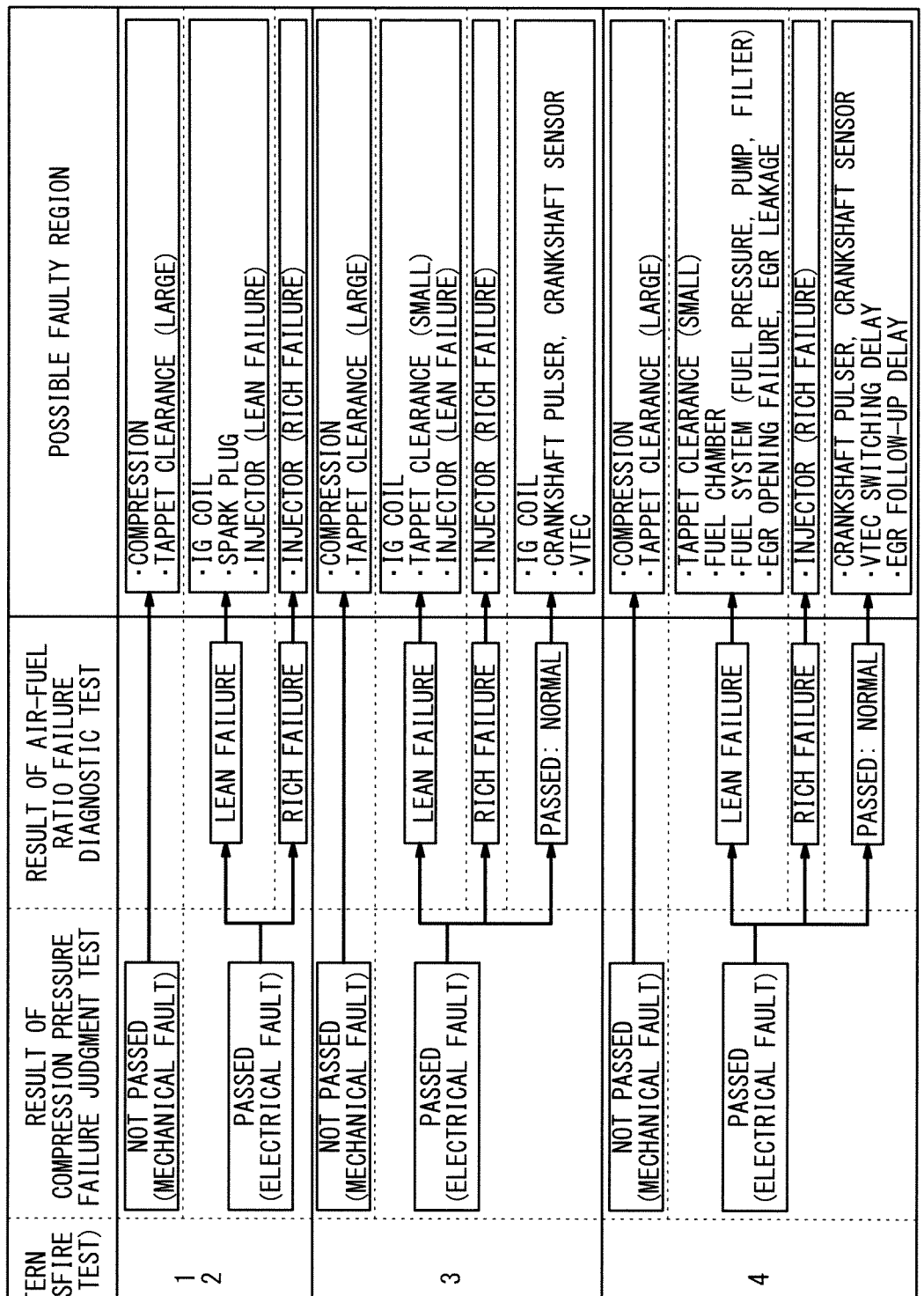
FIG. 9 is a diagram showing by way of example test results and possible faulty regions displayed in the specific work display area.

FIG. 9 is a diagram showing by way of example test results and possible faulty regions, which are displayed in the specific work display area 106. In FIG. 9, the possible faulty regions are displayed depending on the misfire patterns 1 through 4, the result of the compression pressure failure judgment test, and the result of the air-fuel-ratio failure diagnostic test.

More specifically, if the misfire pattern is "1" (SINGLE CYLINDER—SUCCESSIVE MISFIRES) or "2" (PLURAL CYLINDERS—SUCCESSIVE MISFIRES) and the result of the compression pressure failure judgment test indicates "NOT PASSED" (mechanical fault), then "COMPRESSION" and "TAPPET CLEARANCE (LARGE)" are displayed as possible faulty regions. If the misfire pattern is "1" or "2", the result of the compression pressure failure judgment test indicates "PASSED" (no mechanical fault), and the result of the air-fuel-ratio failure diagnostic test indicates "LEAN FAILURE", then "IG COIL", "SPARK PLUG", and "INJECTOR" are displayed as possible faulty regions. If the misfire pattern is "1" or "2", the result of the compression pressure failure judgment test indicates "PASSED" (no mechanical fault), and the result of the air-fuel-ratio failure diagnostic test indicates "RICH FAILURE", then "INJECTOR" is displayed as a possible faulty region.

If the misfire pattern is "3" (SINGLE CYLINDER—RANDOM MISFIRES) and the result of the compression pressure failure judgment test indicates "NOT PASSED" (mechanical fault), then "COMPRESSION" and "TAPPET CLEARANCE (LARGE)" are displayed as possible faulty regions. If the misfire pattern is "3", the result of the compression pressure failure judgment test indicates "PASSED" (no mechanical fault), and the result of the air-fuel-ratio failure diagnostic test indicates "LEAN FAILURE", then "IG COIL", "TAPPET CLEARANCE (SMALL)", and "INJECTOR" are displayed as possible faulty regions. If the misfire pattern is "3", the result of the compression pressure failure judgment test indicates "PASSED", and the result of the air-fuel-ratio failure diagnostic test indicates "RICH FAILURE", then "INJECTOR" is displayed as a possible faulty region. If the misfire pattern is "3", and the result of the compression pressure failure judgment test and the result of the air-fuel-ratio failure diagnostic test indicate "PASSED", then "IG COIL", "CRANKSHAFT PULSER", "CRANKSHAFT SENSOR", and "VTEC" are displayed as possible faulty regions.

If the misfire pattern is "4" (PLURAL CYLINDERS—RANDOM MISFIRES) and the result of the compression pressure failure judgment test indicates "NOT PASSED" (mechanical fault), then "COMPRESSION" and "TAPPET CLEARANCE (LARGE)" are displayed as possible faulty regions. If the misfire pattern is "4", the result of the compression pressure failure judgment test indicates "PASSED" (no mechanical fault), and the result of the air-fuel-ratio failure diagnostic test indicates "LEAN FAILURE", then "TAPPET CLEARANCE (SMALL)", "FUEL CHAMBER", "FUEL SYSTEM (FUEL PRESSURE, PUMP, FILTER)", "EGR OPENING FAILURE", and "EGR LEAKAGE" are displayed as possible faulty regions. If the misfire pattern is "4", the result of the compression pressure failure judgment test indicates "PASSED", and the result of the air-fuel-ratio failure diagnostic test indicates "RICH FAILURE", then "INJECTOR" is displayed as a possible faulty region. If the misfire pattern is "4", and the result of the compression pressure failure judgment test and the result of the air-fuel-ratio failure diagnostic test indicate "PASSED", then "CRANKSHAFT PULSER", "CRANKSHAFT SENSOR", "VTEC SWITCHING DELAY", and "EGR FOLLOW-UP DELAY" are displayed as possible faulty regions.

In step S26 of FIG. 5, the operator judges a fault of each of the possible faulty regions. For example, the specific possible faulty regions (compression, IG coil, etc.) shown in FIG. 9 are linked together with data concerning specific work details. The operator enters one of the options (possible faulty regions) using the operating unit 86. Thereafter, the external diagnosing machine 14 displays, in the specific work display area 106, an overall work flowchart 110 depending on the entered option (possible faulty region) in the overall work display area 104, and also displays specific work details according to the work title box 114 selected in the overall work flowchart 110. The operator refers to the displayed information to confirm whether or not a fault actually is occurring in the possible faulty region. If a fault is actually occurring in the possible faulty region, then the operator repairs the possible faulty region.

The compression pressure failure judgment test and the air-fuel-ratio failure diagnostic test according to the present embodiment will be described below.

(3) Compression Pressure Failure Judgment Test

As described above, the compression pressure failure judgment test is a test for judging a compression pressure failure in the cylinders 36a through 36d, and is capable of judging whether or not a mechanical system fault is occurring. In the compression pressure failure judgment test, the engine 16 is cranked to rotate the crankshaft 48 while at the same time canceling fuel explosion in the cylinders 36a through 36d, and those of the cylinders 36a through 36d that are suffering from a compression pressure failure (compression pressure failure cylinder) are judged based on an angular velocity variation $\Delta\omega$ [rad/s] of the crankshaft 48. According to the present embodiment, when the engine 16 is cranked, both the fuel supply system (fuel injection valve 42, etc.) and the ignition system (spark plug 44, etc.) are disabled.

Figure 10:
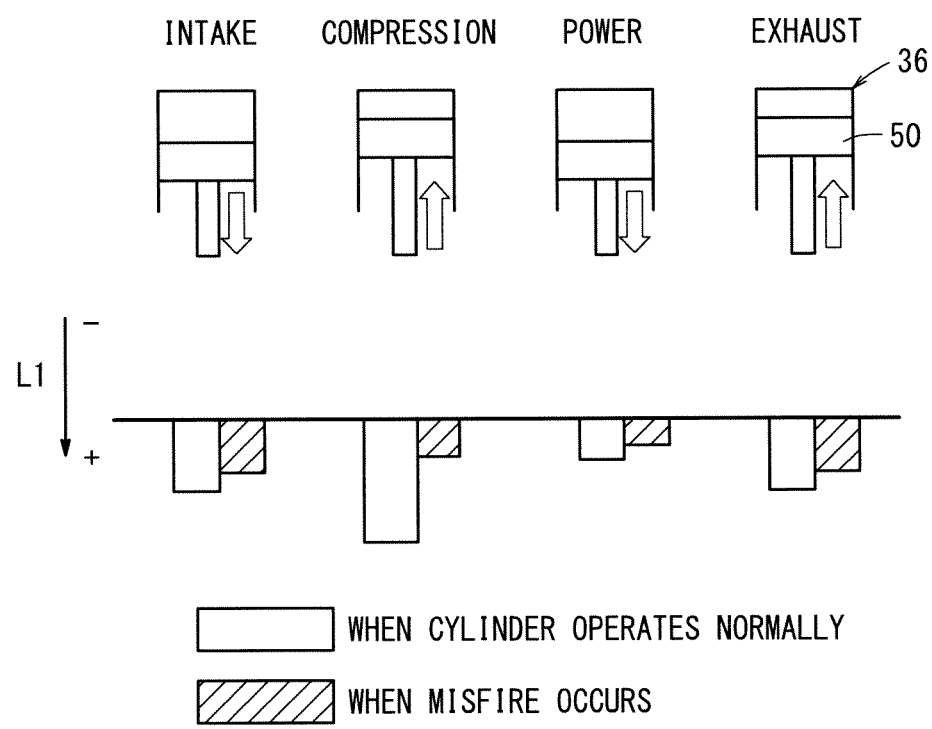
FIG. 10 is a diagram showing by way of example a relationship between strokes of a piston in each cylinder, and the magnitude of a load applied to the crankshaft as the piston operates during cranking of the engine, when the cylinder is operating normally, and when the cylinder suffers from a shortage of compression pressure.

FIG. 10 is a diagram showing a model representation of a relationship between strokes of the piston 50 in each of the cylinders 36a through 36d and the magnitude of a load L1 applied to the crankshaft 48 during operation of the piston 50 upon cranking the engine, at a time that the cylinder 36 is operating normally and when the cylinder 36 is suffering from a shortage of compression pressure. The load L1 induces a reduction in engine rotational speed NE [rpm], i.e., a reduction in the angular velocity $\omega$ [rad/s] of the crankshaft 48. Since fuel explosion is canceled in the cylinders 36a through 36d when the engine is cranked, explosion of fuel does not actually occur in the power stroke shown in FIG. 10. Stated otherwise, the power stroke shown in FIG. 10 represents a stroke having the same range of the crankshaft angle Ac as the power stroke during normal operation of the engine.

In the example shown in FIG. 10, the load L1 applied when the cylinder 36 is operating normally and the load L1 applied when the cylinder 36 is suffering from a shortage of compression pressure are compared with each other. The difference between the compared loads L1 is particularly large during the compression stroke compared with during the intake stroke, the power stroke, and the exhaust stroke. This is because the compressive load is small when a gas leakage occurs somewhere in the cylinder 36.

With the engine 16 having the plural cylinders 36a through 36d, strokes of the cylinders 36a through 36d are kept out of phase with each other in order to produce regular angular velocity variations $\Delta\omega$ which allow the engine 16 to be cranked stably during normal operation thereof. However, when a compression failure occurs in either one of the cylinders 36a through 36d, the compressive load is not applied as required, thereby causing a disturbance in angular velocity variations $\Delta\omega$.

According to the present embodiment, which is based on the above observations, the difference between the loads L1 in the compression stroke is not used directly, but rather, angular velocity variations $\Delta\omega$ in the power stroke are used to judge a shortage of compression pressure. More specifically, this is based on the fact that, when the engine 16 having the cylinders 36a through 36d, which include one cylinder that suffers from a shortage of compression pressure, is cranked, the crankshaft angular velocity $\omega$ increases during the compression stroke of the cylinder that suffers from a shortage of compression pressure, but in reaction thereto, decreases in the next stroke, i.e., the power stroke, of the same cylinder. It is thus possible to judge whether or not a shortage of compression pressure has occurred based on a reduction (variation) in the angular velocity $\omega$ during the power stroke. Accordingly, if the crankshaft angular velocity variation $\Delta\omega$ is used in the logic for judging a misfire, then the same logic used for judging a misfire can also be used as a logic for determining a cylinder that suffers from a shortage of compression pressure.

Figure 11:
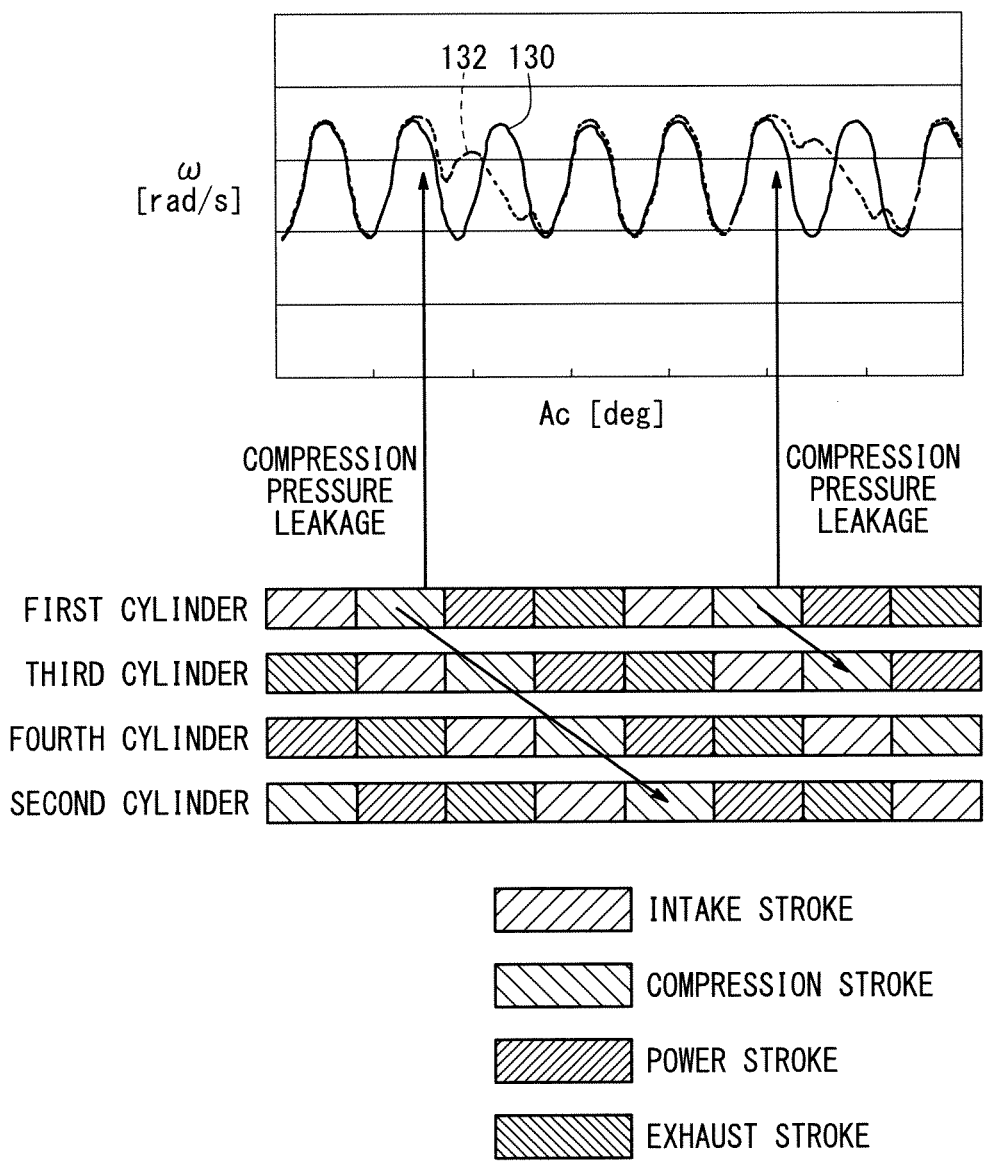
FIG. 11 is a diagram showing by way of example a relationship between crankshaft angles and crankshaft angular velocities, together with strokes (intake, compression, power, and exhaust strokes) of cylinders when first through fourth cylinders are operating normally, and when the first cylinder suffers from a misfire during cranking of the engine.

FIG. 11 shows a model representation of the relationship between crankshaft angles Ac and crankshaft angular velocities $\omega$, along with strokes (intake, compression, power, and exhaust strokes) of the cylinders 36a through 36d when the cylinders 36a through 36d operate normally and when the first cylinder 36a is suffering from a misfire while the engine is being cranked. In FIG. 11, the solid-line curve 130 represents a relationship between crankshaft angles Ac and crankshaft angular velocities $\omega$ at a time that the cylinders 36a through 36d are operating normally, whereas the broken-line curve 132 represents a relationship between crankshaft angles Ac and crankshaft angular velocities $\omega$ at a time that the first cylinder 36a is misfiring.

In the example shown in FIG. 11, the angular velocity $\omega$ drops sharply due to a rotational disturbance in the power stroke, which occurs subsequent to the compression stroke of the first cylinder 36a.

Figure 12:
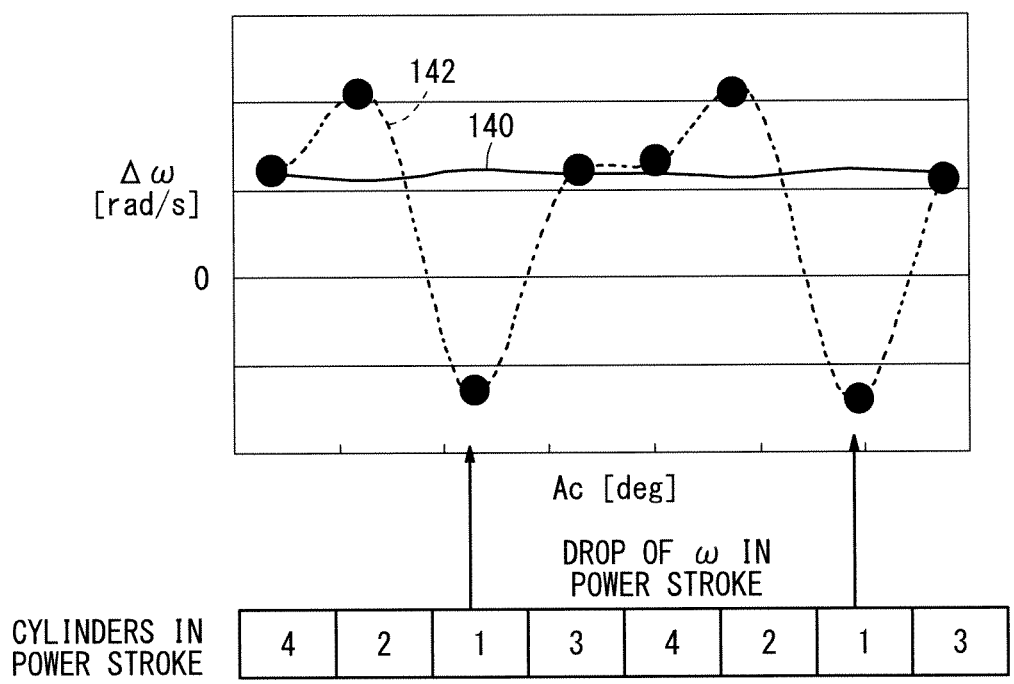
FIG. 12 is a diagram showing a relationship between the crankshaft angles and the angular velocity variations shown in FIG. 11, together with power strokes of the cylinders.

FIG. 12 shows a relationship between crankshaft angles Ac and angular velocity variations $\Delta\omega$, which correspond to the data shown in FIG. 11 and the power strokes of the cylinders 36a through 36d. In FIG. 12, the solid-line curve 140 represents a relationship between crankshaft angles Ac and angular velocity variations $\Delta\omega$ at a time that the cylinders 36a through 36d are operating normally, whereas the broken-line curve 142 represents a relationship between crankshaft angles Ac and angular velocity variations $\Delta\omega$ at a time that the first cylinder 36a is misfiring. In the example shown in FIG. 12, in order to clearly show a compression pressure failure, compression leakages (zero compression pressure) are shown which occur during compression strokes of the first cylinder 36a. In the example shown in FIG. 12, angular velocity variations $\Delta\omega$ are reduced in the power stroke of the first cylinder 36a. This is because a compressive load is not applied while a corresponding increase occurs in the angular velocity variation $\Delta\omega$ during the compression stroke of the first cylinder 36a, and then as a reaction thereto, the angular velocity variation $\Delta\omega$ decreases in the power stroke of the cylinder 36a. It is thus possible to judge whether or not a shortage of compression pressure has occurred in the first cylinder 36a based on a comparison of angular velocity variations $\Delta\omega$ during respective power strokes.

More specifically, the external diagnosing machine 14 calculates individual average values AVEr, a total average value AVEt, and ratios R1 based on the acquired angular velocity variations $\Delta\omega$. The individual average values AVEr represent average values of angular velocity variations $\Delta\omega$ that occur in respective power strokes of the cylinders 36a through 36d. The total average value AVEt is an average of the individual average values AVEr of all of the cylinders 36a through 36d. The ratios R1 are calculated as a quotient of the individual average values AVEr divided by the total average value AVEt (AVEr/AVEt).

The external diagnosing machine 14 judges whether or not there is a mechanical fault in the cylinders 36a through 36d based on the previously read diagnostic fault code and the ratios R1, and displays the judgment result on the display unit 92.

In particular, the external diagnosing machine 14 judges whether or not there is a shortage of compression pressure in a misfiring cylinder based on the ratios R1 with respect to the cylinders 36a through 36d. More specifically, if the ratio R1 with respect to a misfiring cylinder is smaller than a threshold value by which it is judged whether or not there is a shortage of compression pressure (compression force shortage judging threshold value TH2), then the ECU 20 judges that there is a shortage of compression pressure in the misfiring cylinder. According to the present embodiment, the threshold value TH2 is 100%.

Figure 13:
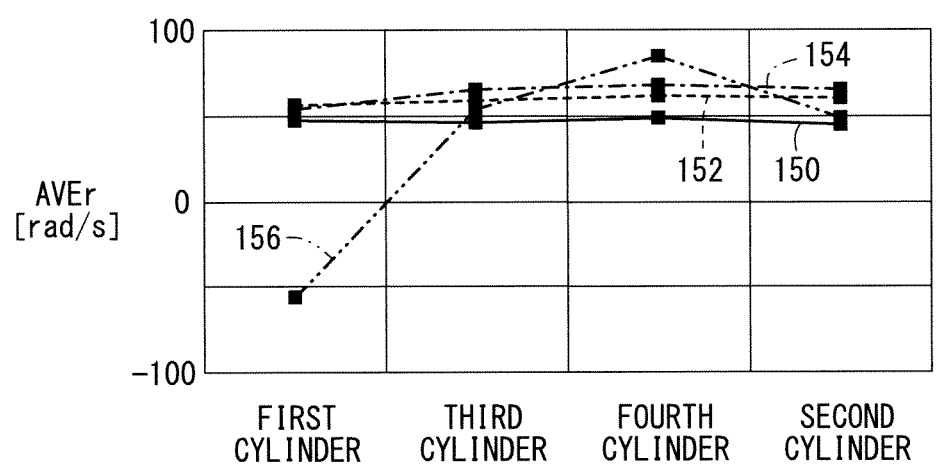
FIG. 13 is a diagram showing by way of example individual average values of angular velocity variations in the case that a tappet clearance of the first cylinder is normal, in the case that a deviation of the tappet clearance is small, in the case that a deviation of the tappet clearance is large, and in the case that the compression pressure is zero at a time that the first cylinder is abnormal and the second through fourth cylinders are normal.

FIG. 13 shows by way of example individual average values AVEr in the case that the tappet clearance TC of the first cylinder 36a is normal (e.g., TC=0.23 mm), in the case that the deviation of the tappet clearance deviation TC is small (e.g., TC=0.13 mm), in the case that the deviation of the tappet clearance TC is large (e.g., TC=0.05 mm), and in the case that the compression pressure is zero at a time that the first cylinder 36a is abnormal and the second through fourth cylinders 36b through 36d are normal.

The solid-line curve 150 represents individual average values AVEr in the case that the tappet clearance TC of the first cylinder 36a is normal (e.g., TC=0.23 mm). The broken-line curve 152 represents individual average values AVEr in the case that the deviation of the tappet clearance deviation TC is small (e.g., TC=0.13 mm). The dot-and-dash-line curve 154 represents individual average values AVEr in the case that the deviation of the tappet clearance TC is large (e.g., TC=0.05 mm). The two-dot-and-dash-line curve 156 represents individual average values AVEr in the case that the compression pressure is zero.

Figure 14:
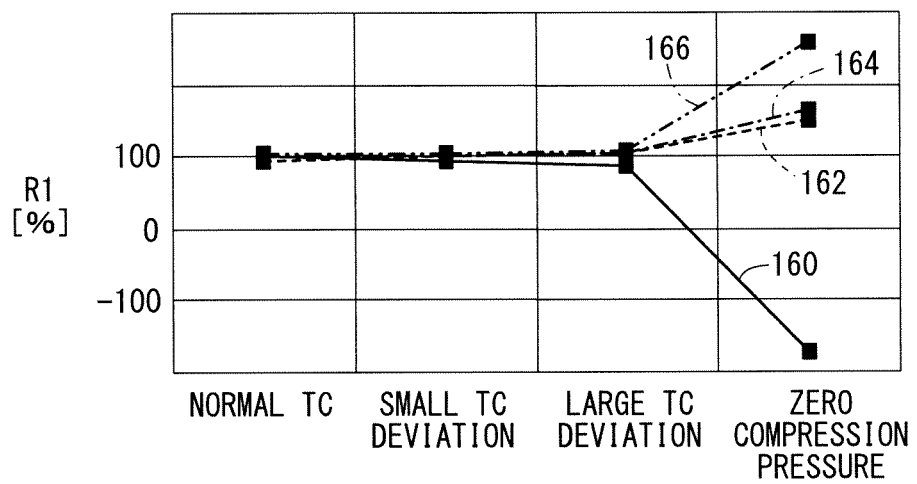
FIG. 14 is a diagram showing ratios of the individual average values to a total average value, based on the individual average values of the cylinders shown in FIG. 13.
Figure 15:
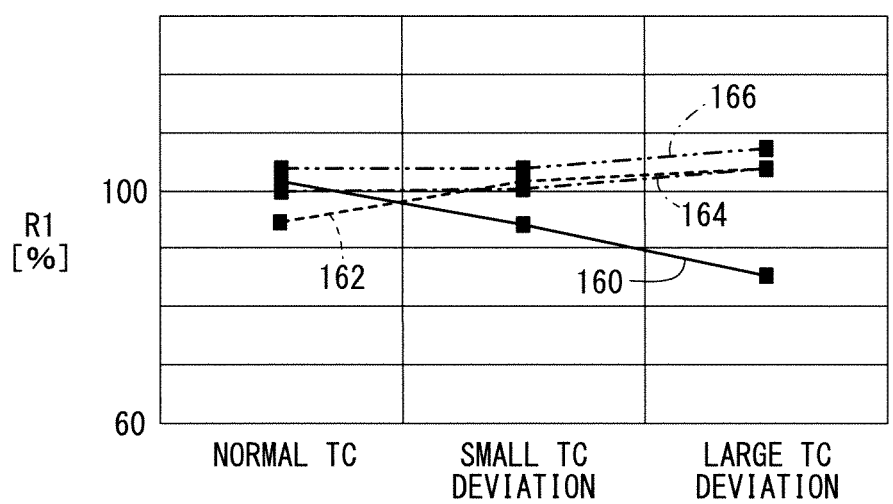
FIG. 15 is a diagram showing at an enlarged scale a portion of the ratios shown in FIG. 14.

FIG. 14 shows ratios R1 (=Avr/AVEt) of the individual average values AVEr to the total average value AVEt, based on individual average values AVEr of the cylinders 36a through 36d shown in FIG. 13. FIG. 15 is a diagram showing, at an enlarged scale, a portion of the ratios shown in FIG. 14. In FIGS. 14 and 15, the solid-line curve 160 corresponds to the first cylinder 36a, the broken-line curve 162 corresponds to the second cylinder 36b, the dot-and-dash-line curve 164 corresponds to the third cylinder 36c, and the two-dot-and-dash-line curve 166 corresponds to the fourth cylinder 36d.

According to the above process, the external diagnosing machine 14 judges a compression pressure failure of the cylinders 36a through 36d in order to determine whether or not a mechanical fault has occurred.

(4) Air-Fuel-Ratio Failure Diagnostic Test

As described above, the air-fuel-ratio failure diagnostic test is a test for diagnosing an air-fuel-ratio failure in the cylinders 36a through 36d, and is capable of judging the occurrence of a lean failure in which the air-fuel ratio is excessively low, and a rich failure in which the air-fuel ratio is excessively high.

(a) Air-Fuel Ratio Control Process According to the Present Embodiment

First, an air-fuel ratio control process according to the present embodiment will be described below. According to the present embodiment, an ordinary air-fuel ratio control process generally is used during operation of the engine 16. The ordinary air-fuel ratio control process is a control process, which is used in the fuel injection valve controlling function of the engine ECU 20. Such a process comprises a combination of a basic fuel injection control process and an air-fuel-ratio feedback control process (hereinafter referred to as an "air-fuel-ratio FB control process").

According to the present embodiment, the basic fuel injection control process is a control process for bringing ratios of the air and fuel (gasoline) in an air-fuel mixture supplied to the cylinders 36a through 36d (hereinafter referred to as "cylinder air-fuel ratios Raf_1 through Raf_4" or collectively as "cylinder air-fuel ratios Raf_n" or simply "air-fuel ratios Raf_n") into a stoichiometric air-fuel ratio (fuel:air=1:14.7).

More specifically, according to a basic fuel injection control process, a relationship between amounts of intake air Qaf, which are detected by the amount-of-intake-air sensor 30, and target values for the injected amounts of fuel Qfi from the fuel injection valves 42 are established beforehand as a map, and the fuel injection valves 42 are controlled depending on a target value for the injected amounts of fuel Qfi, which correspond to a detected amount of intake air Qaf.

However, due to various factors including variations in operation timings (tappet clearances TC) of the intake valves 38 and the exhaust valves 40 of the cylinders 36a through 36d, as well as aging of the fuel injection valve 42, the air-fuel ratios Raf_n of the cylinders 36a through 36d and the total air-fuel ratio Raf_total of the engine 16 overall may not necessarily be equivalent to the stoichiometric air-fuel ratio.

According to the present invention, the air-fuel ratio FB control process is a control process for equalizing the total air-fuel ratio Raf_total to the stoichiometric air-fuel ratio under a feedback control. More specifically, if the detected value from the air-fuel ratio sensor 46 is not equivalent to the stoichiometric air-fuel ratio, then injected amounts of fuel Qfi from all of the fuel injection valves 42 are increased or reduced in order to equalize the detected value with the stoichiometric air-fuel ratio. At this time, the injected amounts of fuel Qfi are corrected using a corrective value Pc. The corrective value Pc is a corrective value for later-described fuel injection ratios Rfi_n [%] (target values) of the cylinders 36a through 36d. However, the corrective value Pc may be a corrective value for a different parameter, for example, the injected amounts of fuel Qfi (target values) or the total air-fuel ratio Raf_total.

According to the present embodiment, since only one air-fuel ratio sensor 46 is disposed downstream of the exhaust manifold 64, air-fuel ratios Raf_n of each of the respective cylinders 36a through 36d are not detected. In the basic fuel injection control process, therefore, the air-fuel ratios Raf_n of respective cylinders 36a through 36d cannot be made to converge to the stoichiometric air-fuel ratio, although the total air-fuel ratio Raf_total of the engine 16 can be made to converge to the stoichiometric air-fuel ratio.

(b) Air-Fuel-Ratio Failure Diagnostic Test

Figure 16:
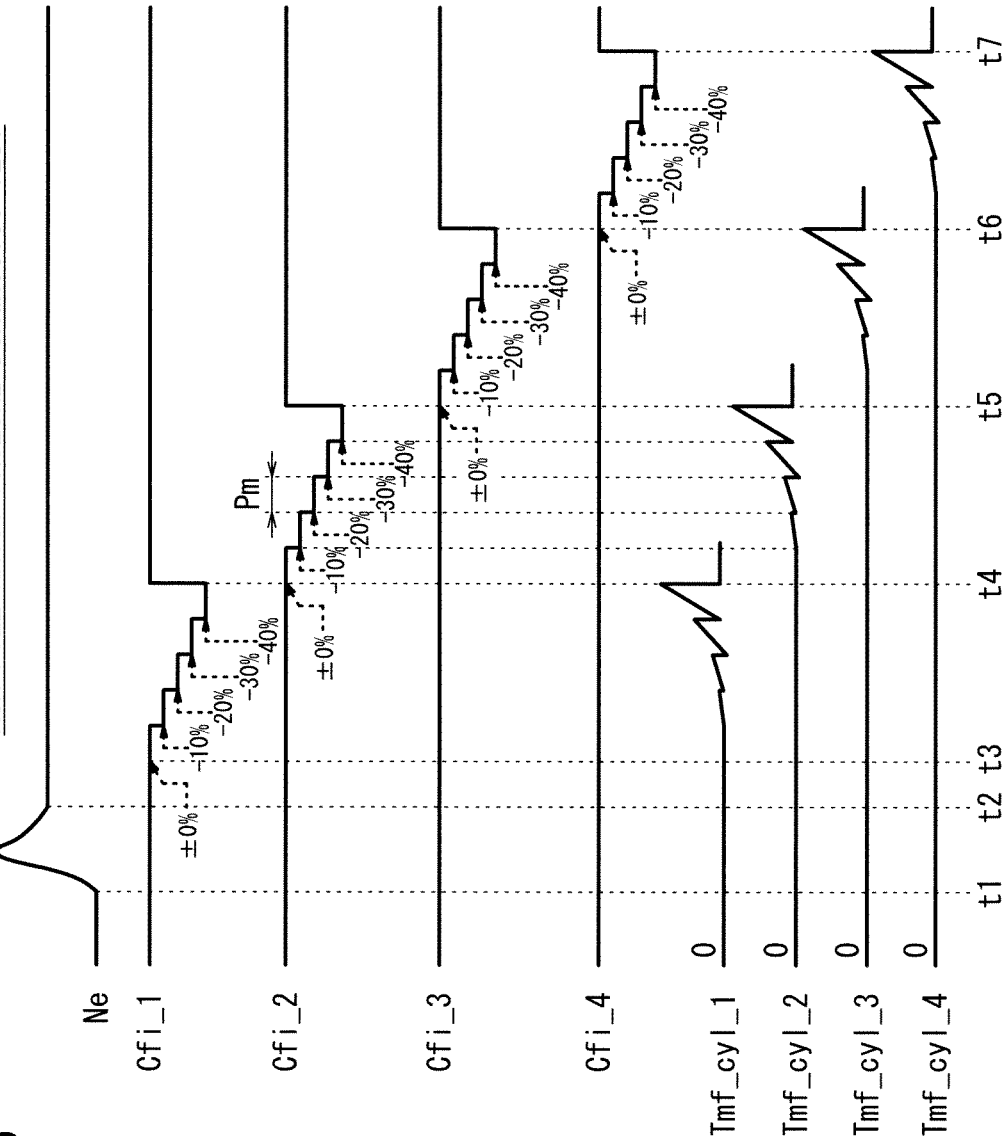
FIG. 16 is a timing chart showing a relationship between engine rotational speed, air-fuel ratios of respective cylinders, and accumulated values of number of misfires occurring in the respective cylinders at a time that an air-fuel ratio failure diagnostic test is conducted.

FIG. 16 is a timing chart showing a relationship between the engine rotational speed NE, the air-fuel ratios of the respective cylinders 36a through 36d (cylinder air-fuel ratios Raf_n), and the accumulated values Tmf_cyl_n [counts] of the number of misfires occurring in the respective cylinders 36a through 36d at the time the air-fuel ratio failure diagnostic test is conducted.

In FIG. 16, the period from time t1 to time t2 defines a warming-up period of the engine 16, the period from time t3 to time t4 defines a test period for diagnosing the first cylinder 36a, the period from time t4 to time t5 defines a test period for diagnosing the second cylinder 36b, the period from time t5 to time t6 defines a test period for diagnosing the third cylinder 36c, and the period from time t6 to time t7 defines a test period for diagnosing the fourth cylinder 36d.

In the air-fuel-ratio failure diagnostic test, as shown in FIG. 16, the cylinders 36a through 36d are operated one by one while changing the cylinder air-fuel ratios Raf_n in a stepwise manner with respect to the cylinders 36a through 36d, which serve as targets to be diagnosed (hereinafter referred to as "target cylinders"). At this time, accumulated values Tmf_cyl_n are detected. The accumulated values Tmf_cyl_n represent accumulated values of the number of misfires of the target cylinders during a measurement period Pm [sec]. The variable "n" in "Tmf_cyl_n" is indicative of the number of a given cylinder in question from among the cylinders 36a through 36d. For example, "Tmf_cyl_1" represents an accumulated value with respect to the first cylinder 36a. Cylinders 36a through 36d other than the target cylinder are controlled according to the basic fuel injection control process.

The measurement period Pm is a period for switching between corrective values Cfi_n, i.e., a period for switching between the fuel injection ratios Rfi_n and the cylinder air-fuel ratios Raf_n (see FIG. 16). Therefore, the accumulated values Tmf_cyl_n represent accumulated values of the number of misfires of the target cylinders each time that the corrective values Cfi_n are switched.

If the cylinder air-fuel ratios Raf_n are not abnormal, then the accumulated values Tmf_cyl_n are zero when the cylinder air-fuel ratios Raf_n are 0%, and the accumulated values Tmf_cyl_n increase as the cylinder air-fuel ratios Raf_n differ progressively away from 0%. It is possible to judge whether or not an air-fuel ratio failure is occurring in the cylinders 36a through 36d by confirming a relationship between the cylinder air-fuel ratios Raf_n and the accumulated values Tmf_cyl_n for the respective cylinders 36a through 36d. More specifically, if the accumulated values Tmf_cyl_n of the number of misfires are smaller when the cylinder air-fuel ratios Raf_n are negative values (e.g., −20%) than when the cylinder air-fuel ratios Raf_n are 0%, then the cylinders 36a through 36d can be the to be suffering from a rich failure in which fuel is injected in an excessive rich state. If a misfire has already occurred when the cylinder air-fuel ratios Raf_n are 0% (e.g., the accumulated values Tmf_cyl_n of the number of misfires are greater than a predetermined threshold value) and the accumulated values Tmf_cyl_n of the number of misfires are greater when the cylinder air-fuel ratios Raf_n are negative values (e.g., −20%), then the cylinders 36a through 36d can be the to be suffering from a lean failure in which fuel is injected in an excessively lean state.

Therefore, the external diagnosing machine 14 is capable of judging whether or not the cylinders 36a through 36d are suffering from a rich failure or a lean failure, based on the relationship between the cylinder air-fuel ratios Raf_n and the accumulated values Tmf_cyl_n of the number of misfires.

3. Advantages of the Present Embodiment

According to the present embodiment, as described above, a misfire pattern of misfires which actually are occurring or that have occurred in the past is detected, and a faulty region is tracked down according to the detected misfire pattern (FIGS. 8 and 9). Consequently, it is possible to significantly reduce the number of man-hours required to identify and confirm a faulty region.

According to the present embodiment, the external diagnosing machine 14 displays as a misfire pattern a graph having a horizontal axis representing time and a vertical axis representing the accumulated values Tmf_cyl_n, (see FIG. 8). Therefore, the operator can easily identify the misfire pattern by visually confirming the graph. The operator can thus easily grasp the situation in relation to misfires that actually are occurring, and to classify the misfires as successive misfires or not. The operator can easily grasp an actual diagnostic work technique concerning judgment of whether successive misfires are occurring or not, and the result of the diagnostic work technique, which is indicative of whether or not successive misfires are occurring, so that the operator can perform work with increased efficiency. In addition, the external diagnosing machine 14 enables even inexperienced operators to upgrade their skill with a high learning capability.

According to the present embodiment, the external diagnosing machine 14 instructs restarting of the engine 16 in an attempt to repeat a misfire in a misfiring cylinder (S17 or S19 in FIG. 4). If a misfire is not repeated (S18: NO or S20: NO), then the external diagnosing machine 14 detects a misfire pattern based on data that was produced upon the occurrence of a misfire (S21). Therefore, even if misfiring is not repeated when the engine 16 is restarted, it is possible to track down faulty regions by using successive data collected upon the occurrence of a misfire at the time that the diagnostic fault code was generated.

According to the present embodiment, the external diagnosing machine 14 instructs the engine 16 to idle in an attempt to repeat a misfire in a misfiring cylinder (S17 in FIG. 4). If a misfire is not repeated (S18: NO), then the external diagnosing machine 14 repeats the situation that took place upon the occurrence of a misfire, based on data that was produced upon the occurrence of a misfire, in order to repeat a misfire in the misfiring cylinder, whereupon the external diagnosing machine 14 detects a misfire pattern (S19). Therefore, even if it is difficult to repeat a misfire while the engine 16 is idling, it is possible to track down faulty regions by positively repeating the condition that took place upon misfiring.

According to the present embodiment, if a misfire is repeated in a misfiring cylinder when the external diagnosing machine 14 instructs restarting of the engine 16 (S18: YES or S20: YES), the external diagnosing machine 14 further tracks down a faulty region by determining a compression pressure shortage cylinder using the compression pressure failure judgment test, and by judging an air-fuel ratio failure using the air-fuel ratio failure diagnostic test. Thus, by determining a compression pressure shortage cylinder and judging an air-fuel ratio failure, it is possible to further track down, from the faulty regions that have been tracked down based on the misfire pattern, considerably limited faulty regions. Consequently, it is possible to further reduce the number of man-hours required to identify and confirm a faulty region.

According to the present embodiment, the misfire patterns include successive misfires that take place in a single cylinder and in plural cylinders, random misfires in a single cylinder, and random misfires in plural cylinders (FIG. 8). Therefore, it is possible to easily classify the misfire patterns and efficiently track down a faulty region.

B. Modifications

The present invention is not limited to the above embodiment, but may employ various additional or alternative arrangements based on the above disclosure of the present invention. For example, the present invention may employ the following arrangements.

1. External Diagnosing Machine 14

In the above embodiment, the external diagnosing machine 14 is used to diagnose the engine 16 of the vehicle 12. However, the external diagnosing machine 14 may be used in connection with other systems having internal combustion engines, e.g., mobile objects such as ships or the like. In the above embodiment, the external diagnosing machine 14 communicates with the engine ECU 20 from an external location outside of the vehicle 12. However, the external diagnosing machine 14 may be incorporated in the vehicle 12. Stated otherwise, the engine ECU 20 may include the functions of the external diagnosing machine 14.

2. Engine 16

In the above embodiment, the engine 16 is an in-line four-cylinder engine. However, the layout and number of the cylinders 36 are not limited to those that make up parts of an in-line four-cylinder engine. The engine 16 may be a V-shaped six-cylinder engine. If the engine 16 is a V-shaped six-cylinder engine, the strokes, i.e., the intake, compression, power, and exhaust strokes, of the six cylinders occur successively in two revolutions (720°) of the crankshaft 48. Consequently, crankshaft angles Ac, which are incremented by 120° (=720°/6), are assigned respectively to the power strokes of the cylinders.

3. Air-Fuel Ratio Sensor 46

In the above embodiment, the engine 16 in its entirety has one air-fuel ratio sensor 46. However, plural air-fuel ratio sensors 46 may be combined with the respective cylinders 36.

4. Misfire Repeatability Test

In the above embodiment, two types of misfire repeatability tests (while the engine is idling, and during repetition of a situation upon occurrence of a misfire) are conducted. However, either one of these two types of misfire repeatability tests may be conducted.

In the above embodiment, the misfire patterns include "SINGLE CYLINDER—SUCCESSIVE MISFIRES", "PLURAL CYLINDERS—SUCCESSIVE MISFIRES", "SINGLE CYLINDER—RANDOM MISFIRES", and "PLURAL CYLINDERS—RANDOM MISFIRES". However, the misfire patterns may include two types of misfire patterns, e.g., "SUCCESSIVE MISFIRES" and "RANDOM MISFIRES", or three types of random misfires, e.g., "SUCCESSIVE MISFIRES", "SINGLE CYLINDER—RANDOM MISFIRES", and "PLURAL CYLINDERS—RANDOM MISFIRES".

In the above embodiment, the operator judges misfire patterns. However, the external diagnosing machine 14 may judge misfire patterns automatically. If the external diagnosing machine 14 automatically judges misfire patterns, then a first misfire threshold value for distinguishing between the absence of a misfire and random misfires, and a second misfire threshold value for distinguishing between random misfires and successive misfires may be established in advance. In this case, the external diagnosing machine 14 compares the accumulated value Tmf_cyl_n of the number of misfires with respect to the cylinders 36a through 36d with the first misfire threshold value and the second misfire threshold value, thereby judging whether each of the cylinders 36a through 36d is not suffering from a misfire, or suffers from random or successive misfires.

In the above embodiment, both the displayed information shown in FIG. 8 and the graph of the accumulated values Tmf_cyl_n of the present number of misfires are displayed in the specific work display area 106, as guidelines for enabling the operator to judge a misfire pattern. However, only the accumulated values Tmf_cyl_n of the present number of misfires may be displayed in the specific work display area 106 as a guideline for enabling the operator to judge a misfire pattern.

In the above embodiment, the external diagnosing machine 14 acquires data upon the occurrence of a misfire directly from the vehicle 12 (engine ECU 20). However, the external diagnosing machine 14 may acquire data indirectly through a relay device upon the occurrence of a misfire. The relay device may be a wireless relay unit, which communicates with the engine ECU 20 via a wired link, and communicates with the external diagnosing machine 14 via a wireless link. Alternatively, the external diagnosing machine 14 may acquire data upon the occurrence of a misfire through a car navigation system having a wireless communication function, or a portable terminal such as a smartphone or the like.

5. Compression Pressure Failure Judgment Test

In the above embodiment, upon cranking the engine 16, both the fuel supply system (fuel injection valve 42, etc.) and the ignition system (spark plug 44, etc.) are disabled. Insofar as explosion of fuel does not occur in the cylinders 36a through 36d, only the fuel supply system may be disabled upon cranking the engine 16.

In the above embodiment, a compression pressure failure is judged using angular velocity variations $\Delta\omega$ occurring during the power stroke. However, a compression pressure failure may also be judged using angular velocity variations $\Delta\omega$ that occur during the compression stroke.

6. Air-Fuel Ratio Failure Diagnostic Test

In the above embodiment, the processor 88 of the external diagnosing machine 14 switches between the cylinder air-fuel ratios Ra_n (the fuel injection ratios Rfi_n and the corrective values Cfi_n) through operation of the engine ECU 20. However, the processor 88 may directly control the fuel injection valves 42 in order to switch between the cylinder air-fuel ratios Raf_n (the fuel injection ratios Rfi_n and the corrective values Cfi_n). Alternatively, the engine ECU 20 may include the functions of the external diagnosing machine 14, so that the engine ECU 20 (the external diagnosing machine 14) can directly control the fuel injection valves 42 in order to switch between the cylinder air-fuel ratios Raf_n (the fuel injection ratios Rfi_n and the corrective values Cfi_n).

In the above embodiment, the corrective values Cfi_n are reduced in order to reduce the air-fuel ratios Raf_n of the respective cylinders 36 from the stoichiometric air-fuel ratio to a leaner air-fuel ratio (FIG. 16). However, the corrective values Cfi_n may be changed in a stepwise manner from a positive value to a negative value, so as to change the air-fuel ratios Raf_n in a stepwise manner from a richer air-fuel ratio to a leaner air-fuel ratio. Alternatively, the corrective values Cfi_n may be changed in a stepwise manner from a negative value to a positive value, so as to change the air-fuel ratios Raf_n in a stepwise manner from a leaner air-fuel ratio to a richer air-fuel ratio. In such cases, the corrective values Cfi_n are not necessarily a combination of ±0%, −10%, −20%, −30%, and −40%, but may be changed in other appropriate ways.

In the above embodiment, the cylinders 36a through 36d, other than the target cylinder, are controlled according to the basic fuel injection control process, whereas the air-fuel ratio Raf_n (the corrective value Cfi_n) of the target cylinder is changed gradually. However, with respect to cylinders 36a through 36d other than the target cylinder, the basic fuel injection control process may be canceled in order to stop injecting and igniting fuel.

7. Other Arrangements

In the above embodiment, a possible faulty region is tracked down by combining the results of the misfire repeatability test, the compression pressure failure judgment test, and the air-fuel ratio failure diagnostic test. However, it is possible to track down a possible faulty region by conducting either one of the compression pressure failure judgment test and the air-fuel ratio failure diagnostic test in addition to the misfire repeatability test.

The invention claimed is:

1. A fault diagnosing method for diagnosing an engine by tracking down a faulty region in the event of a misfire that occurs in a multicylinder engine having a misfire detecting function, using an external diagnosing machine that communicates with an engine control unit, comprising the steps of:

reading a diagnostic fault code representative of a misfiring cylinder from the engine control unit into the external diagnosing machine;

detecting misfire patterns classified depending on whether or not successive misfires occur in the misfiring cylinder; and tracking down faulty regions according to the detected misfire patterns, wherein the step of detecting the misfire patterns further comprises the steps of:

idling the engine in accordance with an instruction from the external diagnosing machine in an attempt to repeat a misfire in the misfiring cylinder;

if a misfire is repeated in the misfiring cylinder, detecting the repeated misfire pattern; and if a misfire is not repeated in the misfiring cylinder, detecting the misfire pattern based on successive data generated upon occurrence of a misfire in the misfiring cylinder, which are stored in the engine control unit at a time that the diagnostic fault code is generated.

2. The fault diagnosing method for diagnosing the engine according to claim 1, wherein the external diagnosing machine displays, as the misfire patterns, a graph having a horizontal axis representing time and a vertical axis representing accumulated values of number of misfires.

3. The fault diagnosing method for diagnosing the engine according to claim 1, wherein the step of detecting the misfire patterns further comprises the steps of:

if a misfire is not repeated in the misfiring cylinder, operating the engine based on data of an operating state of the engine in an attempt to repeat the operating state of the engine, which are stored in the engine control unit at the time that the diagnostic fault code is generated, and if a misfire is repeated in the misfiring cylinder in this operation, detecting the repeated misfire pattern.

4. The fault diagnosing method for diagnosing the engine according to claim 1, further comprising the steps of:

if a misfire is repeated in the misfiring cylinder when the engine restarted in accordance with an instruction from the external diagnosing machine, cranking the engine to rotate a crankshaft while canceling fuel explosion in cylinders of the engine, detecting variations in angular velocity of the crankshaft while the engine is being cranked, and determining a cylinder, which has variations in angular velocity that are equal to or smaller than a predetermined value, as a compression pressure shortage cylinder that suffers from a shortage of compression pressure; and successively changing air-fuel ratios of fuel supplied to the cylinders while the engine is not under a load, and judging an air-fuel ratio failure based on a degree of occurrence of a misfire in the cylinders, thereby further tracking down faulty regions.

5. The fault diagnosing method for diagnosing the engine according to claim 1, wherein the misfire patterns represent successive misfires in a single cylinder, successive misfires in plural cylinders, random misfires in a single cylinder, and random misfires in plural cylinders.

6. A fault diagnosing system for diagnosing an engine, comprising:

an engine control unit for detecting a misfire occurring in an engine having a plurality of cylinders and storing a diagnostic fault code representative of a misfiring cylinder; and an external diagnosing machine for tracking down faulty regions responsible for the misfire;

wherein the external diagnosing machine acquires the diagnostic fault code from the engine control unit and provides guidance concerning a diagnostic work technique that depends on the diagnostic fault code; and the external diagnosing machine detects misfire patterns classified depending on whether or not successive misfires occur in the misfiring cylinder, and tracks down and displays faulty regions according to the detected misfire patterns, and wherein when the external diagnosing machine detects a misfire pattern, the external diagnosing machine idles the engine in an attempt to repeat a misfire in the misfiring cylinder, if a misfire is repeated in the misfiring cylinder, the external diagnosing machine detects the repeated misfire pattern, and if a misfire is not repeated in the misfiring cylinder, the external diagnosing machine detects the misfire pattern based on successive data generated upon occurrence of a misfire in the misfiring cylinder, which are stored in the engine control unit at a time that the diagnostic fault code is generated.

7. The fault diagnosing system for diagnosing the engine according to claim 6, wherein, as the misfire patterns, the external diagnosing machine displays a graph having a horizontal axis representing time and a vertical axis representing accumulated values of number of misfires.

8. The fault diagnosing system for diagnosing the engine according to claim 6, wherein when the external diagnosing machine detects a misfire pattern, if a misfire is not repeated in the misfiring cylinder, the external diagnosing machine operates the engine based on data of an operating state of the engine in an attempt to repeat the operating state of the engine, which are stored in the engine control unit at the time that the diagnostic fault code is generated, and if a misfire is repeated in the misfiring cylinder in this operation, the external diagnosing machine detects the repeated misfire pattern.

9. The fault diagnosing system for diagnosing the engine according to claim 6, wherein:

if a misfire is repeated in the misfiring cylinder when the engine is restarted, the external diagnosing machine cranks the engine to rotate a crankshaft while canceling fuel explosion in cylinders of the engine, detects variations in angular velocity of the crankshaft while the engine is being cranked, and determines a cylinder, which has variations in angular velocity that are equal to or smaller than a predetermined value, as a compression pressure shortage cylinder that suffers from a shortage of compression pressure; and the external diagnosing machine successively changes air-fuel ratios of fuel supplied to the cylinders while the engine is not under a load, and judges an air-fuel ratio failure based on a degree of occurrence of a misfire in the cylinders, thereby further tracking down faulty regions.

10. The fault diagnosing system for diagnosing the engine according to claim 6, wherein the misfire patterns represent successive misfires in a single cylinder, successive misfires in plural cylinders, random misfires in a single cylinder, and random misfires in plural cylinders.

11. A fault diagnosing machine for diagnosing an engine having a plurality of cylinders by tracking down faulty regions responsible for a misfire that occurs in the engine, wherein successive data upon occurrence of a misfire in a misfiring cylinder are acquired directly or indirectly from a vehicle, misfire patterns, which are classified depending on whether or not successive misfires occurs in the misfiring cylinder, are detected based on the successive data, and faulty regions are tracked down according to the detected misfire patterns, and wherein when a misfire pattern is detected, the engine is idled in an attempt to repeat a misfire in the misfiring cylinder, if a misfire is repeated in the misfiring cylinder, the repeated misfire pattern is detected, and if a misfire is not repeated in the misfiring cylinder, the misfire pattern is detected based on the successive data generated upon occurrence of a misfire in the misfiring cylinder, which are stored in the engine control unit at a time that the diagnostic fault code is generated.

\* \* \* \* \*